US007900209B2

(12) United States Patent
Gurevich

(10) Patent No.: US 7,900,209 B2
(45) Date of Patent: Mar. 1, 2011

(54) METHODS AND APPARATUS FOR MESSAGE ORIENTED INVOCATION

(75) Inventor: Michael N. Gurevich, Walnut Creek, CA (US)

(73) Assignee: Inventigo, LLC, Walnut Creek, CA (US)

( * ) Notice: Subject to any disclaimer, the term of this patent is extended or adjusted under 35 U.S.C. 154(b) by 1359 days.

(21) Appl. No.: 11/403,135

(22) Filed: Apr. 11, 2006

(65) Prior Publication Data

US 2006/0242649 A1 Oct. 26, 2006

Related U.S. Application Data

(60) Provisional application No. 60/673,968, filed on Apr. 22, 2005.

(51) Int. Cl.
*G06F 13/00* (2006.01)

(52) U.S. Cl. .......................................... 719/313; 719/330

(58) Field of Classification Search .................. 719/313, 719/330

See application file for complete search history.

(56) References Cited

U.S. PATENT DOCUMENTS

| | | | | |
|---|---|---|---|---|
| 6,425,017 B1 | 7/2002 | Dievendorff et al. | | |
| 7,065,706 B1 * | 6/2006 | Sankar | ........................ | 715/234 |
| 7,203,658 B1 * | 4/2007 | Gidwani et al. | ................ | 705/26 |
| 7,349,905 B1 * | 3/2008 | Jooste | ...................... | 707/999.01 |
| 6,804,818 B1 | 7/2009 | Codella et al. | | |
| 2003/0014488 A1 | 1/2003 | Dalal et al. | | |
| 2003/0115548 A1 | 6/2003 | Melgar | | |
| 2005/0198299 A1 | 9/2005 | Beck et al. | | |

OTHER PUBLICATIONS

Thompson, H. S. et al. eds. (Oct. 28, 2004). "XML Schema Part 1: Structures Second Edition-W3C Recommendation," W3C, visited on May 14, 2007. (145 pages).

International Search Report and Written Opinion mailed on Jul. 14, 2008, for PCT Application No. PCT/US06/13567 filed on Apr. 11, 2006, 10 pages.

* cited by examiner

*Primary Examiner* — Andy Ho

(74) *Attorney, Agent, or Firm* — Mauriel Kapouytian Treffert LLP; Thomas Treffert

(57) ABSTRACT

The invention relates to data processing apparatus and methods for method oriented invocation (MOI) of data processing service modules. MOI Adapters and methods interface compound messages with service modules that process them, advantageously reducing memory and processing time utilization. Compound messages may be progressively parsed and processed, identifying the constituent information items needed by a service module and invoking the service module when all needed information items are available, without using resources to maintain and process superfluous message data. Multiple service modules may be addressed by a single MOI Adapter.

27 Claims, 30 Drawing Sheets

```
<?xml version="1.0"?>
<purchaseOrder orderDate="2004-01-03">
  <shipTo country="US">
    <name>Kim Silva</name>
    <street>123 Kearny Street</street>
    <city>San Francisco</city>
    <state>CA</state>
    <zip>94108</zip>
  </shipTo>
  <billTo country="US">
    <name>Terry Chan</name>
    <street>5 Inventigo Street</street>
    <city>Walnut Creek</city>
    <state>CA</state>
    <zip>94596</zip>
  </billTo>
  <comment>Kim, I hope you find these books useful</comment>
  <items>
    <item partNum="101">
      <productName>XML in a Nutshell</productName>
      <quantity>2</quantity>
      <USPrice>39.95</USPrice>
      <comment>Confirm author Elliotte Rusty Harold</comment>
    </item>
    <item partNum="121">
      <productName>Understanding Web Services</productName>
      <quantity>1</quantity>
      <USPrice>27.95</USPrice>
      <shipDate>2004-05-05</shipDate>
    </item>
  </items>
</purchaseOrder>
```

*Figure 2*

```
module MPOStats {
 interface IPOStats {
   struct {
     int quantity;
     long unit_price;
   } item_s;
 long calcTotalOrderAmount(in int count, in array item_s items);
 long calcMaxItemPrice(in int count, in array item_s items);
 };
};
```

```
[01] long calcTotalOrderAmount(int count, item_s[] items) {
[02]   long total = 0;
[03]   for (int i=0; I<count; i++)
[04]     total = total + items[i].quantity *
items[i].unit_price;
[05]   return total;
[06] }
```

```
<xsd:schema xmlns:xsd="http://www.w3.org/2001/XMLSchema">
 <xsd:element name="purchaseOrder" type="PurchaseOrderType"/>
 <xsd:element name="comment" type="xsd:string"/>
 <xsd:complexType name="PurchaseOrderType">
  <xsd:sequence>
   <xsd:element name="shipTo" type="USAddress"/>
   <xsd:element name="billTo" type="USAddress"/>
   <xsd:element ref="comment" minOccurs="0"/>
   <xsd:element name="items"  type="Items"/>
  </xsd:sequence>
  <xsd:attribute name="orderDate" type="xsd:date"/>
 </xsd:complexType>
 <xsd:complexType name="USAddress">
  <xsd:sequence>
   <xsd:element name="name"   type="xsd:string"/>
   <xsd:element name="street" type="xsd:string"/>
   <xsd:element name="city"   type="xsd:string"/>
   <xsd:element name="state"  type="xsd:string"/>
   <xsd:element name="zip"    type="xsd:decimal"/>
  </xsd:sequence>
  <xsd:attribute name="country" type="xsd:NMTOKEN"
     fixed="US"/>
 </xsd:complexType>
 <xsd:complexType name="Items">
  <xsd:sequence>
   <xsd:element name="item" minOccurs="0" maxOccurs="200">
    <xsd:complexType>
     <xsd:sequence>
      <xsd:element name="productName" type="xsd:string"/>
      <xsd:element name="quantity">
       <xsd:simpleType>
        <xsd:restriction base="xsd:positiveInteger">
         <xsd:maxExclusive value="10"/>
        </xsd:restriction>
       </xsd:simpleType>
      </xsd:element>
      <xsd:element name="USPrice"  type="xsd:decimal"/>
      <xsd:element ref="comment"   minOccurs="0"/>
      <xsd:element name="shipDate" type="xsd:date" minOccurs="0"/>
     </xsd:sequence>
     <xsd:attribute name="partNum" type="SKU" use="required"/>
    </xsd:complexType>
   </xsd:element>
  </xsd:sequence>
 </xsd:complexType>
</xsd:schema>
```

*Figure 7*

```
<MOIParser message="POSchema.xsd" interface="MPOStats.idl">
  <mapping name="MOIcalcTotalOrderAmount"/>
    <invoke name="calcTotalOrderAmount ">
      <argument id="1" name="order_count" type="int"/>
      <argument id="2" name="order_items" type="sequence"/>
        <argument name="quantity" type="int"/>
        <argument name="price" type="long"/>
      </argument>
      <return type="long"/>
    </invoke>
    <context>
        struct { //Figure 3, Lines 3-6 and Figure 7 Lines 30-37
          int quantity;
          long unit_price;
        } item_s;
        items_s order_items [200]; //Figure 3, Line 7 and Figure 7, Line 26
        int item_count; //Figure 3, Line 7 and Figure 7, Line 5
    </context>
    <processing>
      <before set="item_count = 0"/>  // Default initial value
      <states start="BEGIN" finish="END">
        <state id="BEGIN"></state>
        <state id="ITEM"></state>
        <state id="END></state>
      </states>
      <transitions>  //
        <transition from="BEGIN" to="ITEM">
          <condition token="item" type="START"/>
        </transition>
        <transition from="ITEM" to="ITEM">
          <condition token="quantity" type="VALUE"/>
          <action bind="order_itmes[item_count].quantity"/>
        </transition>
        <transition from="ITEM" to="ITEM">
          <condition token="USPrice" type="VALUE"/>
          <action bind="order_itmes[item_count].unit_price"/>
        </transition>
        <transition from="ITEM" to="ITEM">
          <condition token="item" type="END"/>
          <action bind=" item_count += 1"/>
        </transition>
        <transition from="ITEM" to="END">
          <condition token="purchaseOrder" type="END"/>
        </transition>
      </transitions>
    </processing>
```

*Figure 8*

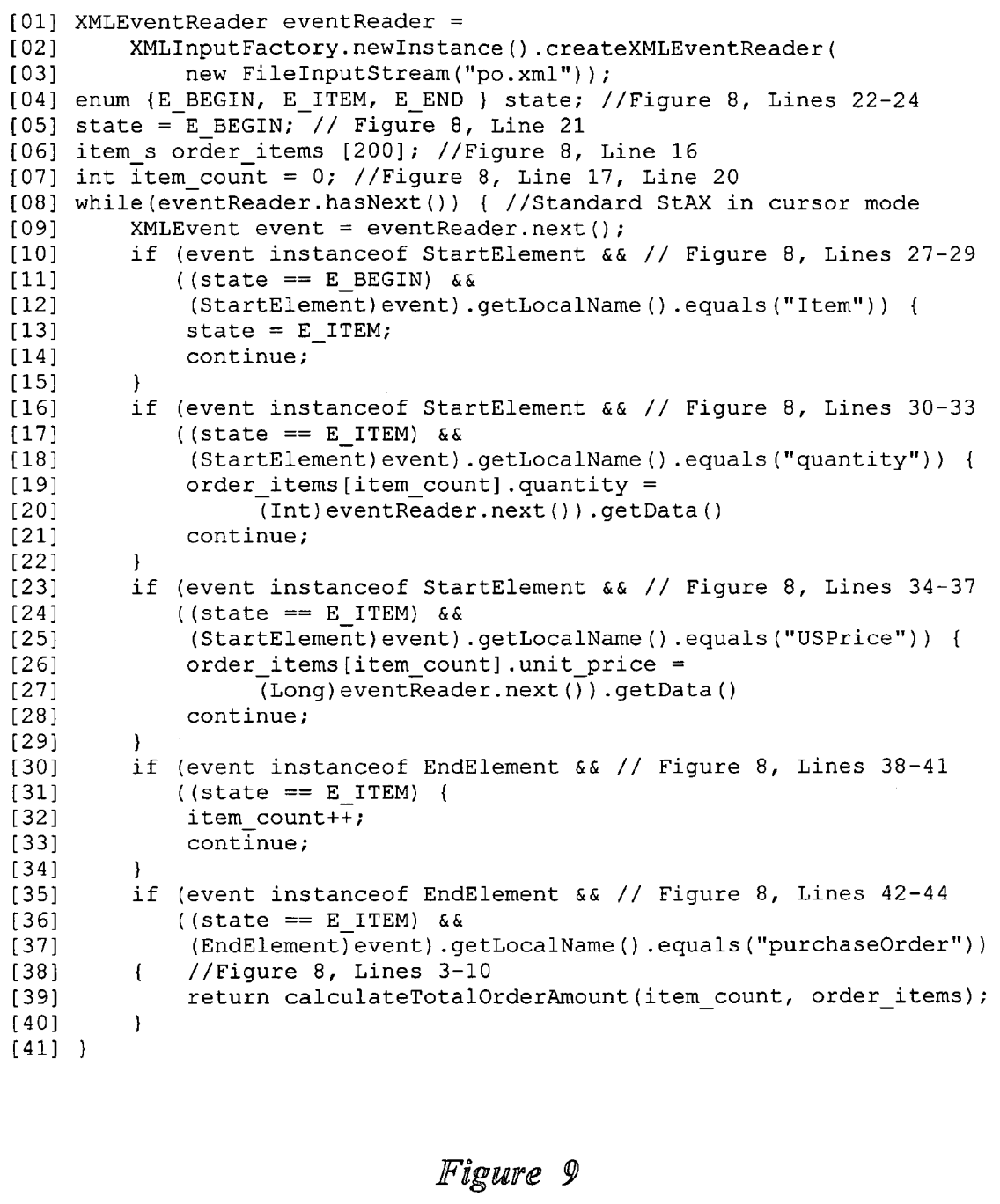

```
XMLEventReader eventReader =
    XMLInputFactory.newInstance().createXMLEventReader(
        new FileInputStream("po.xml"));
enum {E_BEGIN, E_ITEM, E_END } state; //Figure 8, Lines 22-24
state = E_BEGIN; // Figure 8, Line 21
item_s order_items [200]; //Figure 8, Line 16
int item_count = 0; //Figure 8, Line 17, Line 20
while(eventReader.hasNext()) { //Standard StAX in cursor mode
    XMLEvent event = eventReader.next();
    if (event instanceof StartElement && // Figure 8, Lines 27-29
       ((state == E_BEGIN) &&
        (StartElement)event).getLocalName().equals("Item")) {
        state = E_ITEM;
        continue;
    }
    if (event instanceof StartElement && // Figure 8, Lines 30-33
       ((state == E_ITEM) &&
        (StartElement)event).getLocalName().equals("quantity")) {
        order_items[item_count].quantity =
             (Int)eventReader.next()).getData()
        continue;
    }
    if (event instanceof StartElement && // Figure 8, Lines 34-37
       ((state == E_ITEM) &&
        (StartElement)event).getLocalName().equals("USPrice")) {
        order_items[item_count].unit_price =
             (Long)eventReader.next()).getData()
        continue;
    }
    if (event instanceof EndElement && // Figure 8, Lines 38-41
       ((state == E_ITEM) {
        item_count++;
        continue;
    }
    if (event instanceof EndElement && // Figure 8, Lines 42-44
       ((state == E_ITEM) &&
        (EndElement)event).getLocalName().equals("purchaseOrder"))
    {   //Figure 8, Lines 3-10
        return calculateTotalOrderAmount(item_count, order_items);
    }
}
```

*Figure 9*

EXAMPLE UNIFIED INPUT FILE

```
<?xml version="1.0"?>
<xsd:schema xmlns:xsd="http://www.w3.org/2001/XMLSchema"
xmlns:fp="http://www.inventigo.com/fastparser">
  <xsd:element name="Books">
    <xsd:annotation>
      <xsd:appinfo>
        <fp:import>java.util.*</fp:import>
        <fp:import>java.io.*</fp:import>
        <fp:class>BooksData</fp:class>
        <fp:def>int cnt=0;</fp:def>
        <fp:def>List books=new ArrayList();</fp:def>
        <fp:exec>
Set allAuthors=new TreeSet();
for(Iterator iter=books.iterator(); iter.hasNext();) {
  ((Book)iter.next()).collectAuthors(allAuthors);
}
examples.fastparser.Action.foo(cnt, books, allAuthors);
        </fp:exec>
      </xsd:appinfo>
    </xsd:annotation>
    <xsd:complexType>
      <xsd:sequence>
        <xsd:element ref="Book" minOccurs="0" maxOccurs="unbounded"/>
      </xsd:sequence>
    </xsd:complexType>
  </xsd:element>

  <xsd:element name="Book">
    <xsd:annotation>
```

*Figure 11A*

EXAMPLE UNIFIED INPUT FILE (continued)

```
        <xsd:appinfo>
          <fp:class>Book</fp:class>
          <fp:implements>Serializable</fp:implements>
          <fp:def>
public String toString() {
  return "ISBN: "+isbn+"\nAuthor: "+author+"\nName: "+name;
}

public void collectAuthors(Set all_authors) {
  all_authors.add(author);
  for(Iterator iter=chapters.iterator(); iter.hasNext();) {
    ((Chapter)iter.next()).collectAuthors(all_authors);
  }
}
          </fp:def>
          <fp:exec>++parent.cnt; parent.books.add(this);</fp:exec>
        </xsd:appinfo>
      </xsd:annotation>
      <xsd:complexType>
        <xsd:sequence>
          <xsd:element name="Quantity" minOccurs="1" maxOccurs="1"
type="xsd:string">
            <xsd:annotation>
              <xsd:appinfo>
                <fp:def>public int quantity=1;</fp:def>
                <fp:exec>quantity=Integer.parseInt(value);</fp:exec>
              </xsd:appinfo>
            </xsd:annotation>
          </xsd:element>
```

*Figure 11B*

EXAMPLE UNIFIED INPUT FILE (continued)

```
    <xsd:element ref="Price" minOccurs="1" maxOccurs="1"/>
    <xsd:element ref="Chapter" minOccurs="0" maxOccurs="unbounded"/>
  </xsd:sequence>
  <xsd:attribute name="Author" type="xsd:string" use="required">
    <xsd:annotation>
      <xsd:appinfo>
        <fp:def>public String author;</fp:def>
        <fp:exec>author=value;</fp:exec>
      </xsd:appinfo>
    </xsd:annotation>
  </xsd:attribute>

  <xsd:attribute name="Name" type="xsd:string" use="required">
    <xsd:annotation>
      <xsd:appinfo>
        <fp:def>public String name;</fp:def>
        <fp:exec>name=value;</fp:exec>
      </xsd:appinfo>
    </xsd:annotation>
  </xsd:attribute>

  <xsd:attribute name="ISBN" use="required">
    <xsd:annotation>
      <xsd:appinfo>
        <fp:def>public String isbn;</fp:def>
        <fp:exec>isbn=value;</fp:exec>
      </xsd:appinfo>
    </xsd:annotation>
    <xsd:simpleType>
```

*Figure 11C*

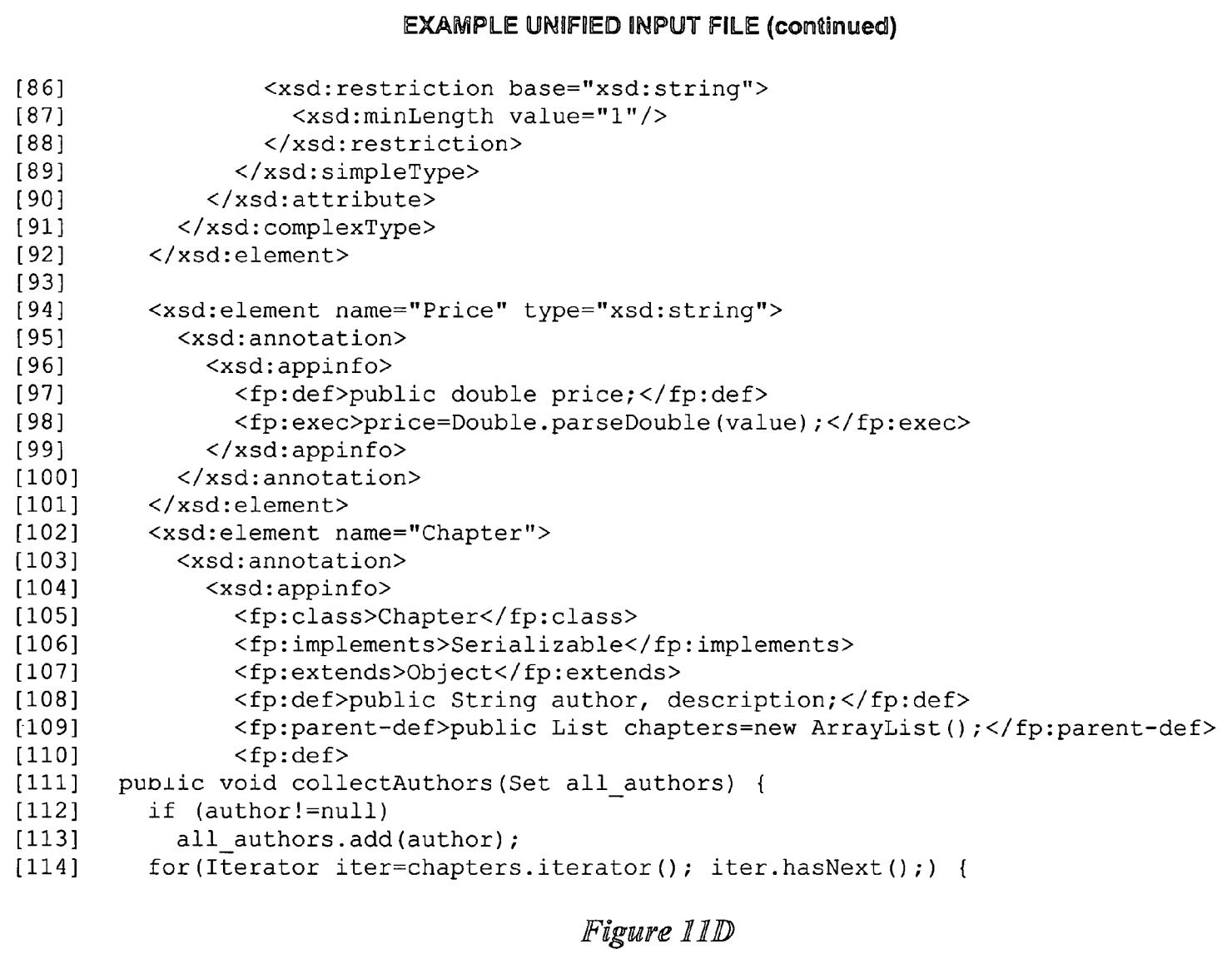

EXAMPLE UNIFIED INPUT FILE (continued)

```
            <xsd:restriction base="xsd:string">
              <xsd:minLength value="1"/>
            </xsd:restriction>
          </xsd:simpleType>
        </xsd:attribute>
      </xsd:complexType>
    </xsd:element>

    <xsd:element name="Price" type="xsd:string">
      <xsd:annotation>
        <xsd:appinfo>
          <fp:def>public double price;</fp:def>
          <fp:exec>price=Double.parseDouble(value);</fp:exec>
        </xsd:appinfo>
      </xsd:annotation>
    </xsd:element>
    <xsd:element name="Chapter">
      <xsd:annotation>
        <xsd:appinfo>
          <fp:class>Chapter</fp:class>
          <fp:implements>Serializable</fp:implements>
          <fp:extends>Object</fp:extends>
          <fp:def>public String author, description;</fp:def>
          <fp:parent-def>public List chapters=new ArrayList();</fp:parent-def>
          <fp:def>
  public void collectAuthors(Set all_authors) {
    if (author!=null)
      all_authors.add(author);
    for(Iterator iter=chapters.iterator(); iter.hasNext();) {
```

*Figure 11D*

EXAMPLE UNIFIED INPUT FILE (continued)

```
[115]       ((Chapter)iter.next()).collectAuthors(all_authors);
[116]     }
[117]   }
[118]         </fp:def>
[119]         <fp:exec>parent.chapters.add(this);</fp:exec>
[120]       </xsd:appinfo>
[121]     </xsd:annotation>
[122]     <xsd:complexType>
[123]       <xsd:sequence>
[124]         <xsd:element name="Description" type="xsd:string">
[125]           <xsd:annotation>
[126]             <xsd:appinfo>
[127]               <fp:exec>description=value;</fp:exec>
[128]             </xsd:appinfo>
[129]           </xsd:annotation>
[130]         </xsd:element>
[131]         <xsd:element ref="Chapter" minOccurs="0" maxOccurs="unbounded"/>
[132]       </xsd:sequence>
[133]       <xsd:attribute name="Author" type="xsd:string" use="optional">
[134]         <xsd:annotation>
[135]           <xsd:appinfo>
[136]             <fp:exec>author=value;</fp:exec>
[137]           </xsd:appinfo>
[138]         </xsd:annotation>
[139]       </xsd:attribute>
[140]     </xsd:complexType>
[141]   </xsd:element>
[142] </xsd:schema>
```

*Figure 11E*

EXAMPLE GENERATED CODE LISTING (continued)

```
    /** The method handles attribute actions for Chapter element.
     * The actions will have String value variable defined for their use.
     */
    public void onChapterStart(org.apache.xerces.xni.XMLAttributes attrs) throws
Exception {
      String value; // attribute value variable

      // executing actions for Author attribute.
      value=attrs.getValue("Author");
      if (value!=null) {
        value=value.trim();
        if (value.length()>0) author=value;
      }

    }

    /** The method handles Chapter element actions
         when the element is found within Book element (or maybe globally).
     * @param parent Book - parent data object. It can be null if there is no
parent.
     * @param value String - element's inner character data.
     */
    public void onChapterFinish(Book parent, String value) throws Exception {
      if (parent!=null) parent.chapters.add(this);
    }

    /** The method handles Chapter element actions
         when the element is found within Chapter element (or maybe globally).
```

*Figure 13B*

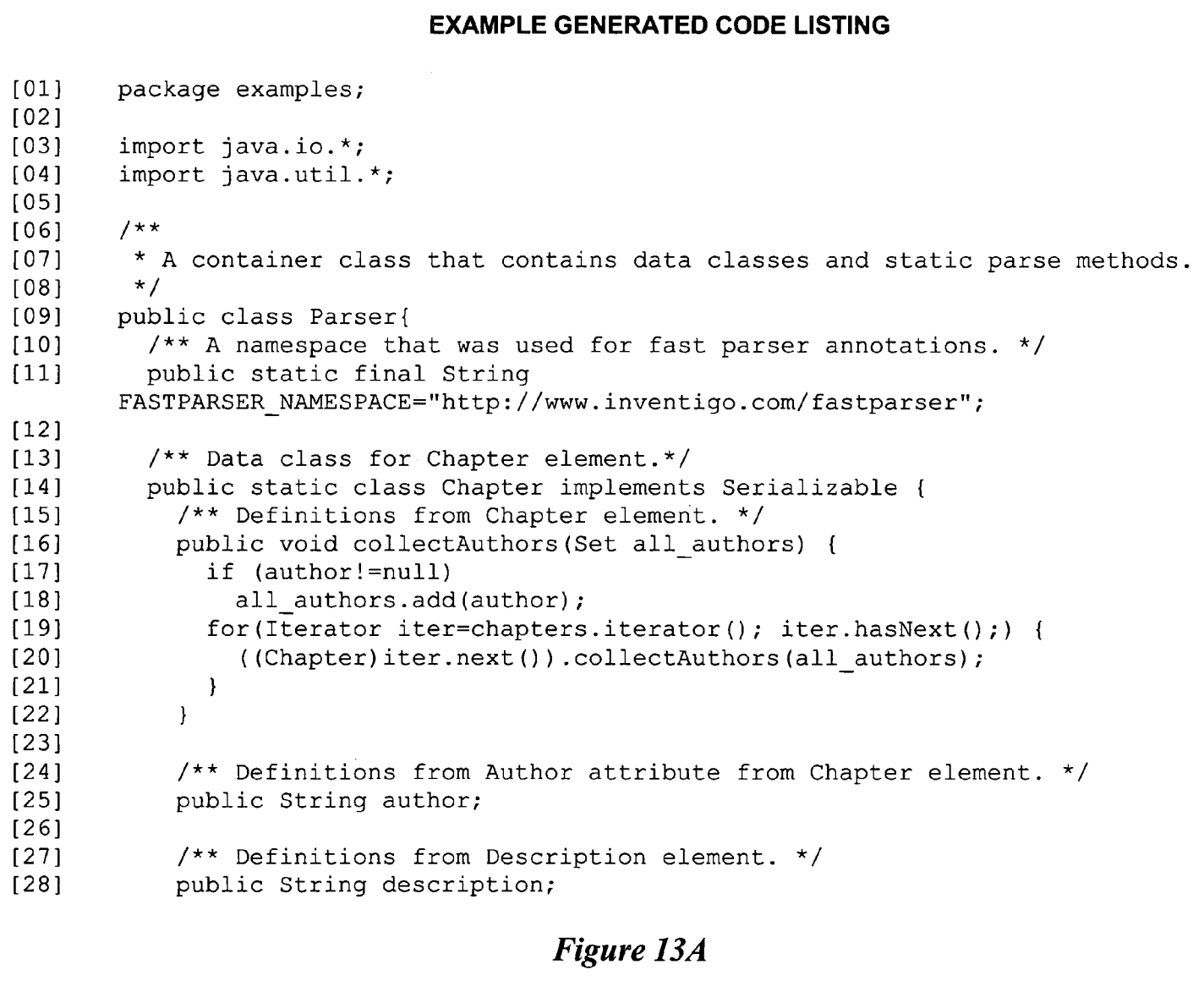

EXAMPLE GENERATED CODE LISTING

```
package examples;

import java.io.*;
import java.util.*;

/**
 * A container class that contains data classes and static parse methods.
 */
public class Parser{
  /** A namespace that was used for fast parser annotations. */
  public static final String
FASTPARSER_NAMESPACE="http://www.inventigo.com/fastparser";

  /** Data class for Chapter element.*/
  public static class Chapter implements Serializable {
    /** Definitions from Chapter element. */
    public void collectAuthors(Set all_authors) {
      if (author!=null)
        all_authors.add(author);
      for(Iterator iter=chapters.iterator(); iter.hasNext();) {
        ((Chapter)iter.next()).collectAuthors(all_authors);
      }
    }

    /** Definitions from Author attribute from Chapter element. */
    public String author;

    /** Definitions from Description element. */
    public String description;
```

*Figure 13A*

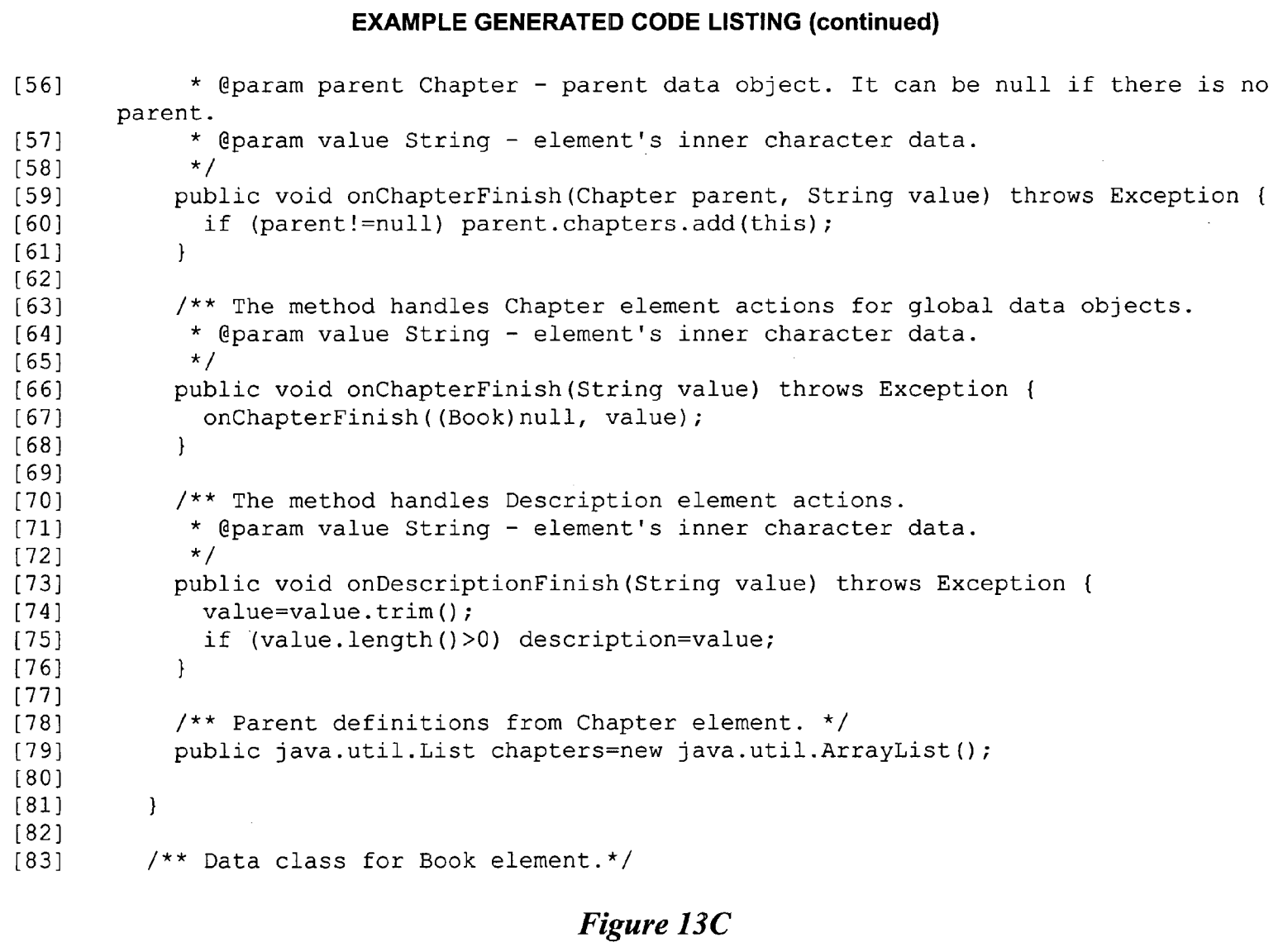

EXAMPLE GENERATED CODE LISTING (continued)

```
     * @param parent Chapter - parent data object. It can be null if there is no
parent.
     * @param value String - element's inner character data.
     */
    public void onChapterFinish(Chapter parent, String value) throws Exception {
      if (parent!=null) parent.chapters.add(this);
    }

    /** The method handles Chapter element actions for global data objects.
     * @param value String - element's inner character data.
     */
    public void onChapterFinish(String value) throws Exception {
      onChapterFinish((Book)null, value);
    }

    /** The method handles Description element actions.
     * @param value String - element's inner character data.
     */
    public void onDescriptionFinish(String value) throws Exception {
      value=value.trim();
      if (value.length()>0) description=value;
    }

    /** Parent definitions from Chapter element. */
    public java.util.List chapters=new java.util.ArrayList();

  }

  /** Data class for Book element.*/
```

*Figure 13C*

EXAMPLE GENERATED CODE LISTING (continued)

```
public static class Book implements Serializable {
  /** Definitions from Book element. */
  public String toString() {
    return "ISBN: "+ISBN+"\nAuthor: "+author+"\nName: "+name;
  }

  public void collectAuthors(Set all_authors) {
    all_authors.add(author);
    for(Iterator iter=chapters.iterator(); iter.hasNext();) {
      ((Chapter)iter.next()).collectAuthors(all_authors);
    }
  }

  /** Definitions from ISBN attribute from Book element. */
  public String ISBN;

  /** Definitions from Author attribute from Book element. */
  public String author;

  /** Definitions from Name attribute from Book element. */
  public String name;

  /** Definitions from Price element. */
  public double price;

  /** Definitions from Quantity element. */
  public int quantity;

  /** The method handles attribute actions for Book element.
```

*Figure 13D*

EXAMPLE GENERATED CODE LISTING (continued)

```
[113]    * The actions will have String value variable defined for their use.
[114]    */
[115]   public void onBookStart(org.apache.xerces.xni.XMLAttributes attrs) throws
        Exception {
[116]     String value; // attribute value variable
[117]
[118]     // executing actions for ISBN attribute.
[119]     value=attrs.getValue("ISBN");
[120]     if (value!=null) {
[121]       value=value.trim();
[122]       if (value.length()>0) ISBN=value;
[123]     }
[124]
[125]     // executing actions for Author attribute.
[126]     value=attrs.getValue("Author");
[127]     if (value!=null) {
[128]       value=value.trim();
[129]       if (value.length()>0) author=value;
[130]     }
[131]
[132]     // executing actions for Name attribute.
[133]     value=attrs.getValue("Name");
[134]     if (value!=null) {
[135]       value=value.trim();
[136]       if (value.length()>0) name=value;
[137]     }
[138]
[139]   }
[140]
```

*Figure 13E*

EXAMPLE GENERATED CODE LISTING (continued)

```
/** The method handles Book element actions
     when the element is found within Books element (or maybe globally).
  * @param parent BooksData - parent data object. It can be null if there is
no parent.
  * @param value String - element's inner character data.
  */
public void onBookFinish(BooksData parent, String value) throws Exception {
  ++parent.cnt; parent.books.add(this);
}

/** The method handles Book element actions for global data objects.
  * @param value String - element's inner character data.
  */
public void onBookFinish(String value) throws Exception {
  onBookFinish((BooksData)null, value);
}

/** The method handles Price element actions.
  * @param value String - element's inner character data.
  */
public void onPriceFinish(String value) throws Exception {
  value=value.trim();
  if (value.length()>0) price=Double.parseDouble(value);
}

/** The method handles Quantity element actions.
  * @param value String - element's inner character data.
  */
public void onQuantityFinish(String value) throws Exception {
```

*Figure 13F*

EXAMPLE GENERATED CODE LISTING (continued)

```
[169]    value=value.trim();
[170]    if (value.length()>0) quantity=Integer.parseInt(value);
[171] }
[172]
[173] /** Parent definitions from Chapter element. */
[174] public java.util.List chapters=new java.util.ArrayList();
[175]
[176] }
[177]
[178] /** Data class for Books element.*/
[179] public static class BooksData {
[180] /** Definitions from Books element. */
[181] int cnt=0;
[182] List books=new ArrayList();
[183]
[184] /** The method handles Books element actions for global data objects.
[185]  * @param value String - element's inner character data.
[186]  */
[187] public void onBooksFinish(String value) throws Exception {
[188]     Set allAuthors=new TreeSet();
[189]     for(Iterator iter=books.iterator(); iter.hasNext();) {
[190]         ((Book)iter.next()).collectAuthors(allAuthors);
[191]     }
[192]     examples:fastparser.Action.foo(cnt, books, allAuthors);
[193]
[194] }
[195]
[196]
```

*Figure 13G*

EXAMPLE GENERATED CODE LISTING (continued)

```
  /** Preprocessed document schema that will be used to parse and process
documents.*/
  public static final com.inventigo.xml.fastparser.SchemaProcessor.SchemaInfo
SCHEMA;  static {
    try {
      SCHEMA=com.inventigo.xml.fastparser.SchemaProcessor.parseSchemaStr("here
be schema"
        , FASTPARSER_NAMESPACE, new
com.inventigo.xml.fastparser.PersistenceHandler());
      SCHEMA.init(Parser.class);
    }
    catch (RuntimeException ex) { throw ex; }
    catch (Exception ex) { throw new RuntimeException(ex); }
  }

  /**
   * Parses document and calls specified actions.
   * @param uri String - document URI. For example: new
File(documentPath).toURI().toString() .
   * @throws IOException if something is wrong with document URI
   */
  public static void parse(String uri) throws java.io.IOException {
    parse(uri, false);
  }

  /**
   * Parses document and optionally returns all global data objects.
   * @param uri String - document URI. For example: new
File(documentPath).toURI().toString()
```

*Figure 13H*

EXAMPLE GENERATED CODE LISTING (continued)

```
[220]      * @param collectObjects boolean - whether the parser should collect created
       data objects.
[221]      * @throws IOException if something is wrong with document URI
[222]      * @return List - a list of global data objects (objects without parents)
[223]      */
[224]    public static java.util.List parse(String uri, boolean collectObjects) throws
       java.io.IOException {
[225]       return new com.inventigo.xml.fastparser.FastParserHandler().parse(uri,
       SCHEMA, collectObjects);
[226]    }
[227]  }
```

*Figure 13I*

METHODS AND APPARATUS FOR MESSAGE ORIENTED INVOCATION

CROSS REFERENCE TO RELATED APPLICATIONS

This application claims the benefit of U.S. Provisional Application Ser. No. 60/673,968, filed Apr. 22, 2005, which is hereby incorporated by reference in its entirety. This application is related to U.S. application Ser. No. 11/250,059, filed Oct. 12, 2005, now abandoned.

FIELD OF THE INVENTION

The invention relates to computer message processing and more particularly to systems employing messages comprising data and metadata.

BACKGROUND OF THE INVENTION

Distributed computing systems, such as client-server systems, rely on communication between different computer programs. The format of messages sent from program to program varies greatly from one system to the next. Messages in a particular system may be of a compound format, including both data and metadata. The data are the values of information items potentially important to the transaction. The metadata are values describing the data itself in a way to extend the recognition and usefulness of the data for processing by computer means. Examples of metadata include the name, representation format, and size of an information item.

Systems utilizing compound messages are on the rise with the growing popularity of XML. A message (document) in XML representation contains data values and metadata intermixed. The metadata exists in the form of tags. Other compound message types exist, such as the EDI transaction set or the SGML document. What is common among these compound message representations is the presence of data and metadata within the message.

The use of the compound message eliminates the need for the receiving computer service program module to have been developed to include a full and precise definition of the message contents. A program module receiving a compound message processes the metadata to recognize and extract the desired information items at runtime. While the receiving program module is more resilient to changes in message content, it imposes the increased processing burden of parsing the inbound message to first extract metadata and then, in turn, to extract the actual information items. This additional processing burden becomes overwhelming particularly in modern data processing systems that exploit modular designs.

Modern data processing systems exploit modularity to provide flexibility for change. For example, a loan request submitted to a bank may require compliance with many different regulatory schemes. Moreover, the precise set of schemes may vary from request to request depending on, for example, the region in which the requester is located. In constructing a data processing system to process loan requests, the bank will implement a different service module for each of the regulatory schemes potentially involved. A loan request is routed for processing to each of the service modules relevant to that particular request. If a regulatory scheme changes, only the respective service module needs to be modified. If a new regulatory scheme emerges, a new service module is added.

The modularity greatly enhances the maintainability and responsiveness to change of the data processing system, but magnifies the processing burden when compound messages are used to dispatch the loan request to the service modules. Each service module may use only a fraction of the information items in the loan request document, but each service module potentially parses all of the message to get the subset of information items it needs. The cost in terms of CPU and memory resources is substantial.

The above-described modularity of a modern data processing systems is often implemented using Object Oriented Programming (OOP). Accordingly, the service module is preferably invoked by calling a method of a programming object's exposed interface.

BRIEF SUMMARY OF THE INVENTION

The invention relates to a novel Message-Oriented Invocation (MOI) aspect of a data processing system. An MOI Adapter in the data processing system receives a compound message. The compound message is accessed serially by the MOI Adapter to locate information items required by a downstream service module to effect desired processing of the message. After the required information items are located, the MOI Adapter invokes the service module by calling a procedure according to the published interface of the module, and provides at that time the required information items in a random access format. Further, the MOI Adapter may invoke the service module before the entire compound message is received, accessed, or parsed.

In another aspect of the invention, the MOI Adapter comprises a message parser component and an MOI Controller component coupled by an interface, wherein the message parser has a further interface for receiving compound messages, the MOI Controller component has a further interface for relaying service requests to an application service module. Further, the interface coupling the message parser and MOI Controller components may allow the MOI Controller to pull events from the message parser. Also, the message parser may incorporate a cursor-based parsing method. Also, the MOI Adapter may be constructed using computer code from an MOI Controller Compiler described hereafter.

The invention further relates to novel data processing systems facilitating the creation of computer code files for implementing MOI Adapters. In one aspect of the invention, an MOI Controller Compiler is embodied as software for execution by computing hardware, which MOI Controller Compiler accesses multiple input data sources during its execution, correlates their contents as needed, and produces a computer code file for an MOI Controller. Input data sources accessed by the MOI Controller Compiler provide information about the construction and content of a compound message, the interface for an application service module, and possibly information about correspondences between components of the just-mentioned message information and interface information.

A further aspect of the invention relates to a method in a computing system for MOI adaptation, comprising the (i) receiving a compound message; (ii) parsing the identity of a next information item; (iii) preferably determining whether the identified information item is needed for a service module invocation, and if not, proceeding to step (ii) without first collecting the identified information item; (iv) collecting the identified information item, for example, by noting its location in computer memory; (v) preferably determining whether the collected information item completes the satisfaction of a list of information items required to invoke a first service module, and if not, proceeding to step (ii) without first invoking the first service module; (vi) invoking the first service module using at least the collected information item; and preferably (vii) determining whether any further service module invocations are desired for the compound message, and if not, then terminating the processing of the message by the above recited steps.

One skilled in the art will understand that the practice of the invention is not limited to the illustrative examples presented above. Further, one skilled in the art will understand that embodiments practicing aspects of the invention may achieve one or more of the many advantages of the invention noted in this application.

BRIEF DESCRIPTION OF THE DRAWINGS

FIG. 2 illustrates an example of a compound message file.

FIG. 7 illustrates an example schema file for an XML compound message.

FIG. 8 illustrates an example of a message-to-IDL binding specification file.

FIG. 9 illustrates a program code file for an example MOI Adapter.

FIGS. 11A through 11E, collectively referred to as FIG. 11, depict an illustrative example of a unified MOI compiler input file.

FIGS. 13A through 13I, collectively referred to as FIG. 13, depict an illustrative example of a code file generated by an MOI Controller Compiler.

In the Figures, the same reference number appearing in multiple figures indicates the appearance of the same item in multiple figures.

DETAILED DESCRIPTION OF THE INVENTION

Figure 1:
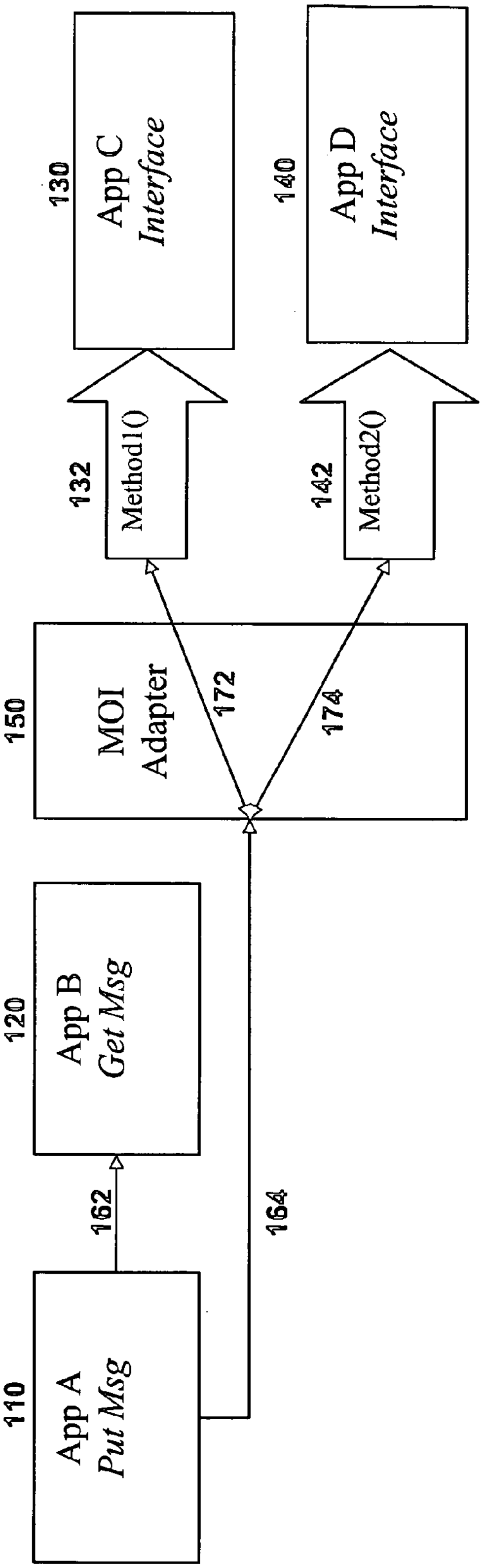
FIG. 1 is a block diagram of a system of the type in which the invention can be advantageously employed.

FIG. 1 is a block diagram of a computer-based data processing system of the type in which the invention can be advantageously employed. Two message-oriented applications 110, 120 and two service-oriented applications 130, 140 are integrated via MOI Adapter 150. MOI Adapter 150 converts message 164 into method invocations 172 to Method1 132 of Application Interface C 130 and 174 to Method2 142 of Application Interface D 140. Advantageously, MOI Adapter 150 makes no restrictions on the format of message-oriented application messages (e.g., 164), signatures of service-oriented application interfaces (e.g., 132, 142), or the number of message-oriented applications (e.g., 110) and service-oriented applications (e.g., 130, 140) it integrates. Further, MOI Adapter 150 can parse an inbound message (e.g. 164) one time to locate all of the information necessary to invoke multiple services (e.g., 132, 142). This represents a further advantage of the present invention. In a preferred embodiment, message 164 is an XML message.

Use of the novel MOI Adapter in a system such as illustrated in FIG. 1 advantageously allows message-oriented modules to be employed that can be constructed without advance knowledge (and designed-in dependency) of downstream service modules that might process its output message. Use of the novel MOI Adapter in a system such as illustrated in FIG. 1 similarly allows service-oriented modules to be employed that can be constructed without advance knowledge (and designed-in dependency) of the detailed implementation of an upstream message. As both message-oriented and service-oriented modules exist today, the novel means for integration and interoperability provided by the present invention represents a significant advantage.

(FIG. 1 also shows message-oriented application 120 which is not coupled to MOI Adapter 150. Message-oriented application 120 is a service module that is invoked to process output message 162 of application 110 by means other than a call to a procedure exposed as a published interface of application 120. One such illustrative means is the network transmission of message 162 addressed to application 120. As an advantage of the present invention, message-oriented application 110 can send a message 164 with identical content as message 162 to MOI Adapter 150, to take advantage of the data processing services provided by applications 130 and 140, without changing any of applications 110, 130, or 140 to incorporate detailed information on the input, output, and interface requirements of any of the others. This demonstrable advantage of the present invention is of particular importance in consolidating businesses where data systems of disparate design can be integrated without changes to the reliable and proven underlying code bases.)

FIG. 2 illustrates an example of a compound message file (PO.xml). The term "file," as used here and throughout this patent specification, refers to a coherent set of computer data identifiable as a unit and operated on by a computer program. Some examples of files in accordance with the intended meaning include disk files, memory buffers, streams, database record sets, and object oriented programming data collections. The compound message file of FIG. 2 is an XML representation of a typical business document, a purchase order, for illustration. Line 01 designates the representation format. Lines 02 and 32 designate the start and end of the purchase order document, respectively. Lines 03 through 09 embody a "shipTo" informational section. Values for individual information items such as the shipTo name "Kim Silva" are designated by beginning and ending tags <name> and </name> after the fashion seen in line 04. Lines 10 through 16 embody a "billTo" information section. Lines 18 through 31 embody an "items" information section comprising information for a first item in lines 19 through 24, and a second item in lines 25 through 30.

Figures 3, 4:
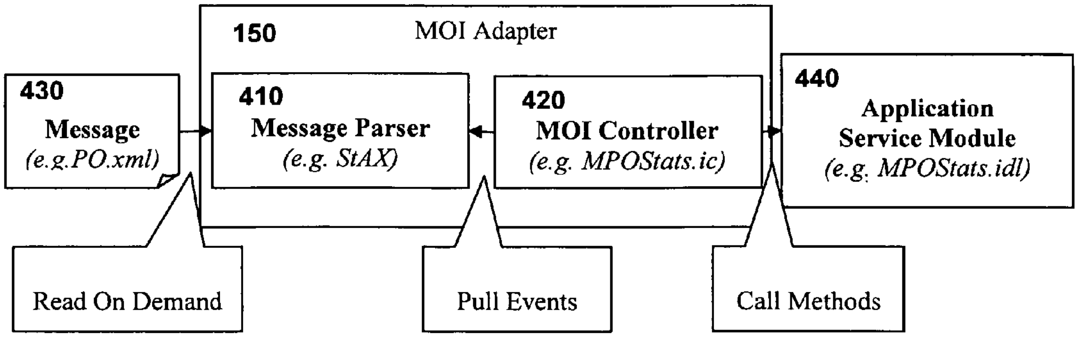
FIG. 3 depicts an IDL code file specifying the interface definition for an illustrative service module.
FIG. 4 is a block diagram highlighting a preferred embodiment of an MOI Adapter.

FIG. 3 depicts an Interface Definition Language (IDL) code file (MPOStats.idl) specifying the interface definition for an illustrative service module for processing information items from a message file as illustrated in FIG. 2. The IDL code file of FIG. 3 represents the publication of a defined interface for a service-oriented module. The published interface indicates a particular service interface named IPOStats in line 02. Interface IPOStats is invoked to calculate useful statistics from information of a purchase order. Interface IPOStats comprises two methods (procedural operations) indicated in lines 07 and 08. For example, calcTotalOrderAmount (line 07) is an illustrative method that calculates the total amount of a purchase order. As an input it requires an array of order items and the count of items in the array.

FIG. 4 is a block diagram highlighting a preferred embodiment of an MOI Adapter. MOI Adapter 150 comprises Message Parser 410 coupled to MOI Controller 420. Message Parser 410 comprises a receiver component for accessing input messages from a message source such as 430. MOI Controller 420 has a service demand component for invoking the process operations of external service modules such as service module 440.

Coupling for the MOI adapter in a preferred embodiment is as follows. Message Parser 410 is coupled to MOI Controller 420 via an interface that allows MOI Controller 420 to pull events from Message Parser 410, allowing MOI Controller 420 to regulate the interaction. The receiver component of Message Parser 410 is coupled to a message source via an interface that allows Message Parser 410 to read sequential message content on demand, allowing the Message Parser to regulate the interaction. The service demand component of MOI Controller 420 is coupled to service module 440 via an interface of service module 440 having a published specification for requesting a particular operational process and providing related information items in a randomly accessible format. The preferred provision of information items in a randomly, or directly, accessible format in this embodiments allows the service module to use information items without regard to the order they first appeared in the inbound message. In one embodiments, the information items are provided at one time, positioned in memory in accordance with a published IDL description.

Also in a preferred embodiment, Message Parser 410 parses an input message using a cursor-based parsing method. An example of a cursor-based parsing method is StAX, well known in the art.

Message source 430 of FIG. 4 would, for example and illustration, provide the XML file (PO.xml) of FIG. 2 to MOI Adapter 150 in operation. Similarly, the interface for service module 440 would be published as the IDL file (MPOStats.idl) of FIG. 3.

Figures 5, 6:
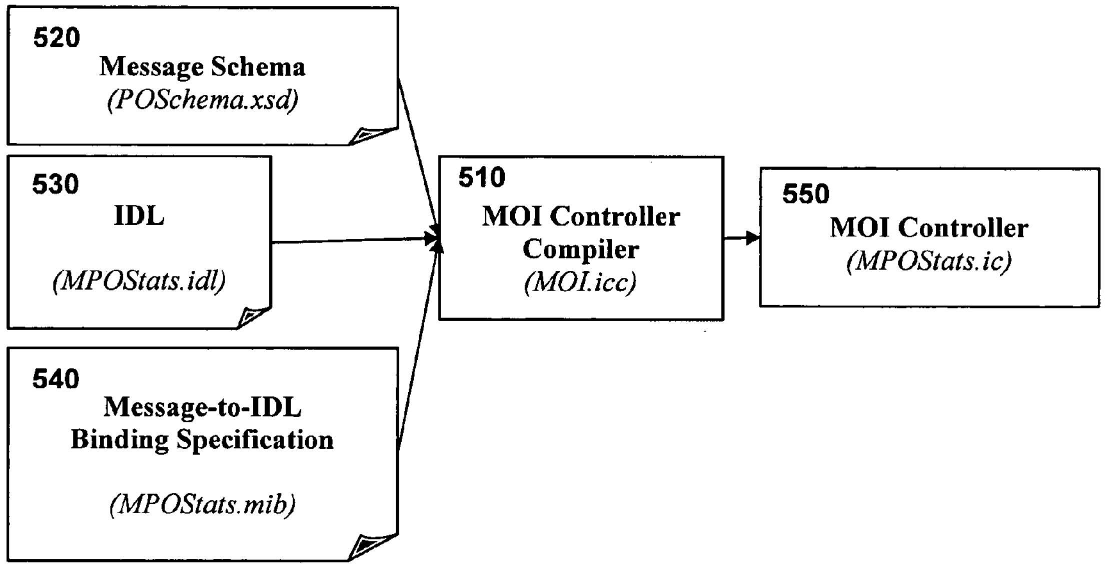
FIG. 5 is a block diagram depicting MOI Controller Compiler operation.
FIG. 6 illustrates an example of service module code implementing a particular method.

FIG. 5 is a block diagram depicting MOI Controller Compiler operation. The MOI Controller Compiler generates computer code files for implementing MOI Adapters. The MOI Controller Compiler 510 accesses multiple input data sources, correlates their contents, and generates an output file of computer code 550 for implementing an MOI Controller such as 420 of FIG. 4, as part of an MOI Adapter (e.g., 150 of FIGS. 1 and 4). Principally, the MOI Controller Compiler 510 in a preferred embodiment generates computer code file 550 by binding an application specific schema 520 for a message that will be received by the MOI Adapter implemented using MOI Controller code file 550, with one or more signatures of an IDL which publishes one or more interface methods of a service module that the implemented MOI Adapter will invoke. Information from IDL 530 is used to predetermine the set of information items the MOI Controller will collect in order to exercise a service module interface represented in the IDL. Additionally, the MOI Controller Compiler 510 may utilize a Message-to-IDL Binding Specification file 540 to direct the binding process.

The Message Schema file 520 provides MOI Controller Compiler 510 with information regarding the construction and contents of a message. Such information includes, for example, the names and data types of information items in the message. The IDL file 530 provides MOI Controller Compiler 510 with information specifying the exposed interfaces for an application service module. Such information includes, for example, the method names and the required order, data types, and names of information items to be provided to the method at the time of invocation.

A Message-to-IDL Binding Specification file 540 may not be required in every instance. For example, where information items published in the IDL for a specific method invocation have identical names and formats to information items specified in the related message schema, a Message-to-IDL Binding Specification file would not be required. (Such one-to-one correlation is easily performed, for example, by simply matching the identical names.) The optional Message-to-IDL Binding Specification 540, when utilized, provides MOI Controller Compiler 510, as needed, with (1) information specifying direct correlations between message information items as designated in the message schema, with invocation information items as designated in the IDL, and (2) information specifying any data processing operations to be performed on message information items as designated in the message schema, in order to produce correlating invocation information items as designated in the IDL. In response to the direct correlation information just described, the MOI Controller Compiler generates code into MOI Controller file 550 to provide an information item from an inbound message according to schema 520 to a correlating parameter for a method invocation according to IDL 530. In response to the data processing operations information just described, the MOI Controller Compiler generates code into MOI Controller file 550 to effect data processing operations (e.g., summing, counting, averaging) on information items from an inbound message according to schema 520, to produce a correlated information item value for a parameter of a method invocation according to IDL 530.

One skilled in the art can further appreciate the invention with respect to the material depicted in FIGS. 6 through 9, useful in illustrating the operation of an MOI Controller Compiler to generate an MOI Controller file (MPOStats.ic). The illustrative MPOStats.ic file is useful in implementing an MOI Adapter (such as 150 of FIGS. 1 and 4) to receive a purchase order message as illustrated in FIG. 2 and to invoke a service module (such as 130, 140 of FIG. 1; 440 of FIG. 4) with an interface published as in FIG. 3. FIG. 6 illustrates an example of service module code implementing a particular method. The example code of FIG. 6 implements the calcTotalOrderAmount method. The interface for the calcTotalOrderAmount method was seen earlier in published form in the IDL file depicted in FIG. 3. In the illustrative case, IDL file MPOStats.idl of FIG. 3 corresponds to IDL file 530 of FIG. 5. The method implementation code of FIG. 6 is used in the illustrative case to construct an application service module (such as 440 of FIG. 4) that is invoked by an MOI Controller (such as 420 of FIG. 4) which has been constructed using MOI Controller file (such as 550 of FIG. 5).

Note that the implementation of the calcTotalOrderAmount method in FIG. 6 is simple and portable due to the fact that it need not be concerned with, and can be completely free of, the format of the input message. A reduction in the required dependencies of a service module on message formats is one of the stated goals and a definite advantage of embodiments practicing the invention.

FIG. 7 illustrates an example schema file for an XML compound message. File POSchema.xsd shown in FIG. 7 corresponds, in the illustrative case, to message schema file 520 of FIG. 5, and presents a schema for the XML purchase order message depicted in FIG. 2. Observe the message schema POSchema.xsd shown in FIG. 7, in order to appreciate the illustrative binding of the message PO.xml to the method calcTotalOrderAmount of the interface MPOStats.idl. Note that quantity and unit price of items are defined in lines 24-45. Note, however, that count of purchased items, which is explicitly required by the calcTotalOrderAmount method, is not defined (i.e. is implicit) in the message. In a preferred embodiment, a Message-to-IDL Binding Specification file provides input to an MOI Controller Compiler to address implicit data.

FIG. 8 illustrates an example of a Message-to-IDL binding specification file. In the illustrative case, FIG. 8 corresponds to the Message-to-IDL Binding Specification 540 of FIG. 5. To make the example of FIG. 8 self contained, lines are included that are not strictly required and could be extracted by a MOI Controller Compiler from other sources. For example, lines 4-18 are not required as a MOI Controller Compiler can extract relevant information directly from the IDL.

Lines 19-46 define the target controller's state machine. The state machine represents data processing operations to be performed using input message information items in order to produce, in this illustrative case, the count of purchased items as required by method calcTotalOrderAmount of the service module but not explicit in the input message. Lines 11-18, define the context into which the controller will gather the token. Line 20 defines how to set the context before execution. Line 21 defines the beginning and the ending state of the state machine. Every transition defines the starting "from" state and the target "to" state. Conditions (Lines 28, 31, 35, 39) are defined in terms of the names and types of the message tokens. For example, <condition token="quantity" type="VALUE"/> means the value of the token (message element) named "quantity". During state transitions the controller updates the context as defined by the corresponding <action> instruction (Lines 32, 36, 40). For example <action bind="order_itmes[item_count].unit_price"/> binds the corresponding value of the token with the specified point in the context. When the controller reaches its end state the context contains all tokens required to make the method call. The controller performs the method call as it is defined in the <invoke> section (Lines 3-10).

Note that lines 26-45 contain the significant new information. These lines define conditions and actions for harvesting elements from the message which are required for the method invocation. All other lines can either be derived from the supplied inputs (Message Schema and IDL definitions) or "hard coded" (Lines 21-25). Specifically, lines 21-25 define three states of a simple state machine, where the BEGIN state defines the initial scanning phase before any of the relevant items are found; the ITEM state defines the state after the controller found at least one item of relevance ("item harvesting state"); the END state defines the condition when there will be no more relevant items in the message. Implicitly, the END state triggers the controller to invoke the corresponding method.

Creation of Message-to-IDL binding specification files may be supported in an Integrated Development Environment (IDE) that simplifies the process of defining binding specification files via a user friendly GUI. Preferably, the entire Message-to-IDL Binding Specification (Lines 1-46) is be generated by the IDE that is based on a WYSYWYG ("What You See Is What You Get") GUI for defining the mappings and actions. In such IDE the programmer is able to point to elements of the message and visually bind them to parameters of the IDL by, for instance, clicking and dragging with a mouse. However, regardless of whether the Message-to-IDL Binding specification file is defined manually or generated automatically, a MOI Controller Compiler is able to optimize the parsing process and method invocation, especially in case when multiple invocations are defined for a single message. In such case the MOI Controller Compiler can generate code for a controller capable of extracting all elements required for all method invocations in a single pass process. Further, the resultant MOI Controller implementation can limit parsing to as much of the message as necessary to collect needed information items. Such efficiency gains represent a further advantage of the invention.

FIG. 9 illustrates a program code file for an example MOI Adapter Controller. For the illustrative case, the MOI Controller implementation code file of FIG. 9 corresponds to MOI Controller file 550 of FIG. 5.

Figure 10:
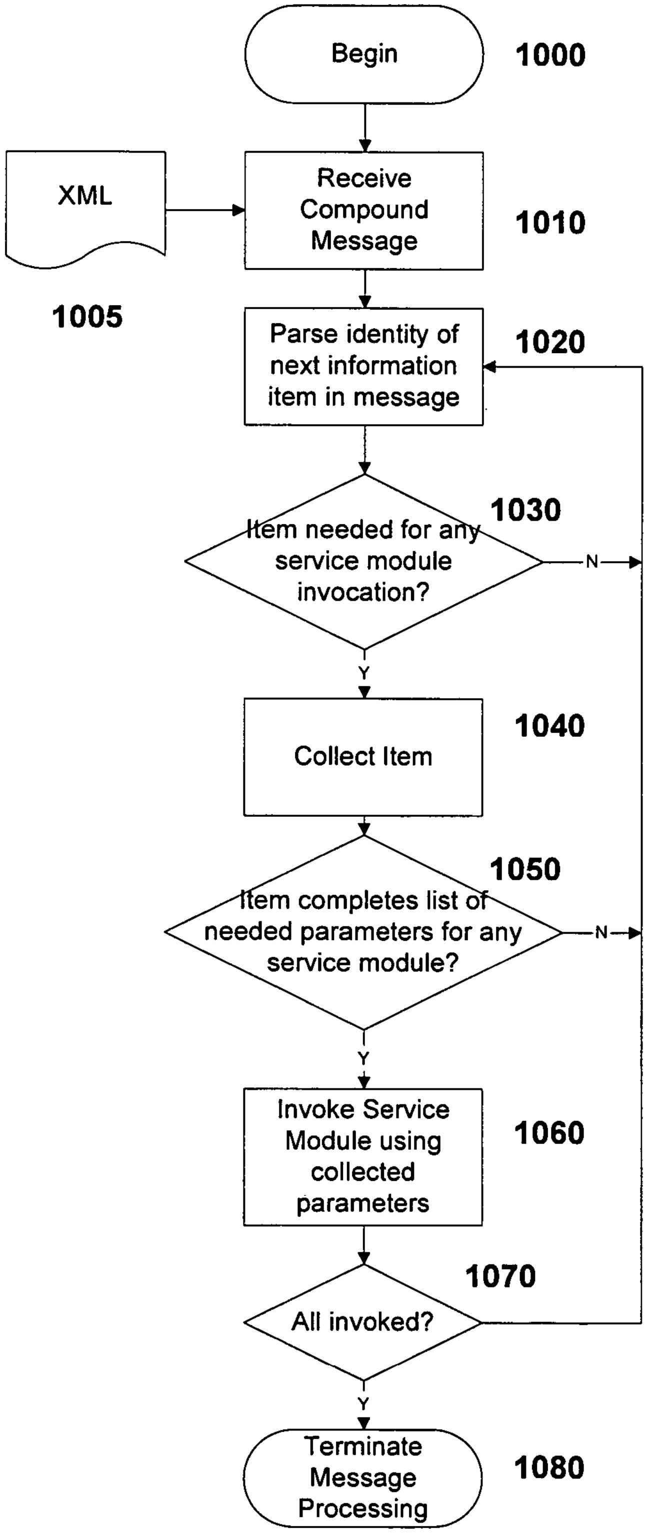
FIG. 10 is a flowchart of MOI Adapter operation in one embodiment.

FIG. 10 is a flowchart of MOI Adapter operation in one embodiment. The processing of the MOI Adapter begins with program initiation at step 1000. The MOI Adapter then receives a compound message, such as XML file 1005, at step 1010. As some or all of the message is received, parsing of the message takes place at step 1020. At least the identity of the next information item in the message is parsed and a determination of whether the item is needed to effect a service module invocation is made, in step 1030. If the item is not needed, a subsequent item in the message is retrieved and similarly analyzed. If the item is needed, it is collected at step 1040. A determination is then made at step 1050 as to whether the most recently collected item provides the last item needed in order to make a service module invocation. If not, additional information items are retrieved from the message. If so, the service module is invoked using the collected parameters at step 1060. A determination is then made at step 1070 as to whether there are other service module invocations remaining to be made. If not, additional information items are retrieved from the message. If so, processing terminates, at least for the present message, at step 1080. Termination of the processing may be implemented in various ways. For example, the parser may be signaled to stop accessing additional message data and to flush the memory of any remaining unparsed message data. As another example, the relevant portion of the MOI Controller may refrain from requesting any additional message data from the parser. Regardless of the use of these or other mechanisms to terminate processing of the current message, processing time utilization is conserved by not processing unnecessary message data, a further advantage of such embodiments.

In an MOI Adapter such as 150 of FIG. 4, comprising a Message Parser 410 and an MOI Controller 420, steps 1010 through 1020 of FIG. 10 are preferably performed by the Message Parser and steps 1030 through 1070 are preferably performed by the MOI Controller. Step 1010 of FIG. 10 may in some embodiments, preferably, be performed in a progressive manner, where message data is received incrementally. This has the advantage of reducing the amount of memory concurrently occupied by message data. Similarly, step 1020 of FIG. 10 may in some embodiments, preferably, be performed in a progressive manner, where message data for one or a few information items is parsed and passed on for evaluation before more items are parsed. This similarly and preferably produces lower memory utilization, as well as conserving processing time utilization that might otherwise be wasted on parsing information items that are not needed by a service module. Step 1030 of FIG. 10 may in some embodiments, preferably, include the step of indicating within the operating environment that certain data in memory is no longer needed and that the occupied memory can be reused, for example, the memory occupied by an information item that has been determined unnecessary to effect a service module invocation. Such an indication may be made, for example, by affirmatively deallocating the memory or by using the destroy method of a programming object that holds the data in memory. Such an indication may be made in other environments, for example, by eliminating all reference pointers to the information item in memory or by adding a reference pointer to the memory in a free memory list. One skilled in the art recognizes the diversity and variability of mechanisms to indicate the reusability of memory areas containing data no longer needed. Similarly, step 1080 of FIG. 10 may in some embodiments, preferably, include the step of indicating within the operating environment that certain data in memory is no longer needed and that the occupied memory can be reused, for example, the memory occupied by unparsed compound message data.

In a preferred embodiment a MOI Controller Compiler can combine multiple Message Schemas, multiple IDLs, and multiple Messsage-to-IDL Binding Specifications to generate a single pass controller. That is a further advantage of the inventive aspects as it allows independent development or modification of messages or interfaces, yet not losing efficiency of a single pass transformation of any message to computationally friendly set of parameters for method invocations. For example, a mortgage application document (message) may require processing by multiple reviewers (each reviewer being an application service module) for different aspects of regulatory compliance. Each reviewer can be independently developed and bound to the mortgage application message by its own Message-to-IDL Binding Specification. When all binding specifications are combined and compiled, a single controller can invoke all reviewers in such a way that each reviewer has direct (random) access to the parameters it requires. All invocations can be performed just in time when all required data elements are harvested and all reviewers can be invoked in parallel while the incoming message is parsed only once and in one pass fashion. A change of the reviewer only affects its own Message-to-IDL Binding Specification, while the controller is re-generated by the compiler.

One skilled in the art can further appreciate inventive aspects with respect to the material depicted in FIGS. 11 through 13 which are useful in illustrating the operation of one preferred MOI Controller Compiler in constructing a preferred MOI Controller and Adapter.

FIGS. 11A through 11E, collectively referred to as FIG. 11, depict an illustrative example of a unified MOI compiler input file. Line numbers appear in brackets and identify all text up to the succeeding line number (long lines wrap to the next physical line). In the preferred embodiment now described, the data inputs to the MOI Controller Compiler, depicted as separate data sources 520, 530, and 540 in FIG. 5, are combined into a single file such as that illustrated by FIG. 11. In this embodiment, implementation IDL data (530 of FIG. 5) and Message-to-IDL Binding Specification data (540 of FIG. 5) are embedded into Message Schema (520 of FIG. 5) as XML Annotations. The Message Schema data of FIG. 11 is in XML Schema format in accordance with the W3C Recommendation defined at http://www.w3.org/TR/xmlschema-1/ and attached hereto as Appendix A, which is hereby incorporated by reference. The implementation IDL data and Message-to-IDL Binding Specification data are embedded as XML Schema Annotations in accordance with the same recommendation. One skilled in the art can understand the example of a unified MOI compiler input file combining Message Schema, IDL, and Message-to-IDL Binding Specifications by reference to FIG. 11.

The presently described MOI Controller Compiler embodiment parses the XML of a unified input file such as the example of FIG. 11 to extract the data for the Message Schema, the IDL, and the Message-to-IDL Binding Specifications in a single pass. Parsing is old and well known in that art and a parser for processing an XML Schema can be created using understood methods in light of the specification for the XML Schema syntax (such as Appendix A, here). Widely known and available parsers also exist in the public domain, such as SAX, StAX, and Xerces, and can be advantageously employed in the construction of an MOI Controller Compiler (and the MOI Adapter). The presently described embodiment uses Release 2.7.1 of the Xerces2 Java parser, despite its "push" interface for the MOI Controller Compiler, to simplify the handling of duplicate element names in a message schema. Source code for this and other Xerces parsers (for multiple programming languages and targeted for multiple operating platforms) is available at http://xml.apache.org/, for example.

The presently described embodiment of one preferred MOI Controller Compiler generates source code for an MOI Controller instance using Processing Instructions supplied in the Message-to-IDL Binding Specification data. Collectively, Processing Instructions define action semantics of the MOI Controller which can be divided into two distinct categories. The first category comprises action semantics for collecting relevant message elements and putting them into objects of corresponding classes as defined by Class Declaration, Class Definition, and Action Commands. This category addresses processing needs for inbound message elements. The second category comprises action semantics for IDL method invocations as defined by Package Includes and Action Commands. This category addresses processing needs for outbound application service module invocations.

Processing Instructions are illustratively defined in the present embodiment as follows (with examples cited from FIG. 11):

Class Declaration Processing Instructions declare class names and are delimited with <fp:class> tags. Examples are seen in FIG. 11 at lines 8 (BooksData class) and 30 (Book class). Class Declaration Processing Instructions optionally include the name of a parent class delimited by <fp:extends> tags. An example can be seen at line 107 (Object parent class). Class Declaration Processing Instructions optionally include the names of implemented interfaces delimited by <fp:implements> tags. An example can be seen at line 31 (Serializable interface).

Class Definition Processing Instructions define the class. Class Definition Processing Instructions include Member Definition instructions delimited by <fp:def> tags. An example can be seen at line 9 (cnt member). Class Definition Processing Instructions further include Method Definition instructions also delimited by <fp:def> tags. An example can be seen at lines 32 through 43 (toString and collectAuthors methods).

Class Definition Processing Instructions further include Parent Definition instructions that define statements to be put into all classes defined (via Class Declarations and Class Definitions) for elements that are parents of the subject schema element. Parent Definition instructions are delimited by <fp:parent-def> tags. An example can be seen at line 109 (chapters object).

Action Command Processing Instructions define processing performed by the MOI Controller as the MOI Parser of the MOI Adapter sequentially processes relevant elements of an inbound compound message (such as 400 of FIG. 4). Action Command Processing Instructions are delimited by <fp:exec> tags. Action Command Processing Instructions include Element Attribute Processing Instructions that are executed by the compiled MOI Controller in association with a start_element event, i.e., when parsing signals the start of a new element in the inbound compound message stream. An example is seen at line 64 (assignment to the author variable). Action Command Processing Instructions further include Element Text Processing Instructions that are executed by the compiled MOI Controller in association with an end_element event, i.e., when parsing signals the end of the current element in the inbound compound message stream. An example is seen at line 53 (assignment to the quantity variable). Element Text Processing Instructions are chiefly directed at processing the value of the element, i.e., the message stream data occurring between the end of the opening tag and start of the closing tag for the element.

Action Command Processing Instructions can be used to collect relevant message elements as illustrated by the examples just cited (lines 64 and 53). Action Command Processing Instructions can also be used for IDL method invocations. An example is seen at line 16 (examples.fastparser-.Action.foo invocation).

Package Include Processing Instructions define an external package (including the IDL such as 530 of FIG. 5) to be included in the manufactured MOI Controller. Class Definitions and Action Commands can reference (use) classes defined within included packages. Package Include Processing Instructions are delimited by <fp:import> tags in this illustrative embodiment. Examples are seen at lines 6 and 7 (java.util and java.io packages).

The above represent the Processing Instructions defined in the illustrative embodiment.

FIGS. 12A through 12E, collectively referred to as FIG. 12, is a flowchart of an MOI Controller Compiler in one embodiment. The flowchart varies in the level of detail provided in order to more clearly convey the main processing flow of the illustrative embodiment. The presently illustrated MOI Controller Compiler functions to perform MOI Controller Compiler functions as previously discussed in relation to FIG. 5. Notably here, the compiler utilizes a unified MOI compiler input file (1201 of FIG. 12) such as that previously described in relation to FIG. 11. In block 1212 of FIG. 12, unified input file 1201 is parsed and a representation tree is built in memory. At 1214, the tree is harvested to build a collection of all message-to-IDL Binding instructions that were embedded in the unified message to facilitate later compiler processing. At 1216, a unique method name is assigned to each Action Command. This step eliminates the need for manually naming Action Commands allowing Action Commands in the unified file to contain only actual action semantics.

Figure 12A:
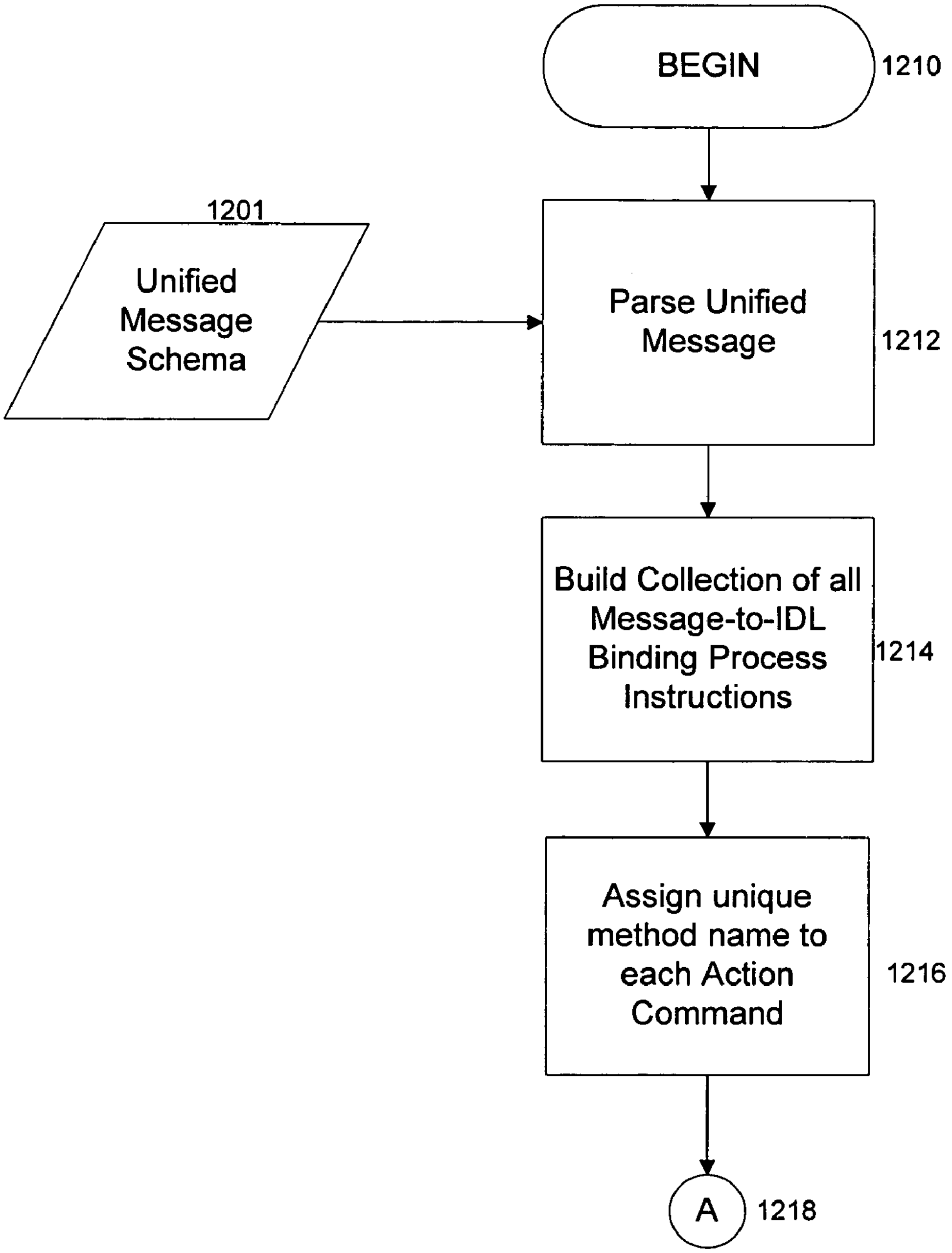
FIGS. 12A through 12E, collectively referred to as FIG. 12, is a flowchart of an MOI Controller Compiler in one embodiment.
Figure 12B:
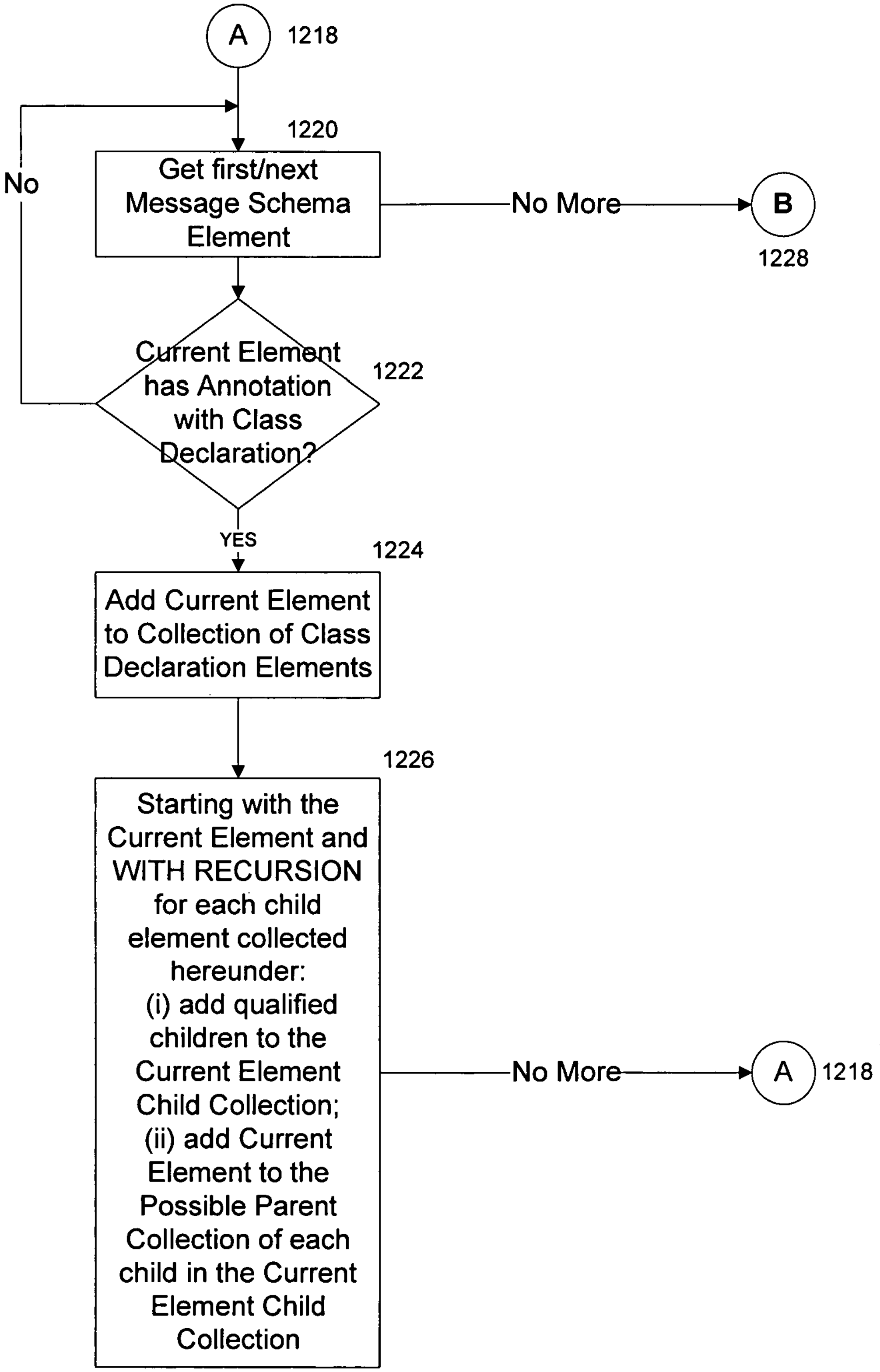

Blocks 1218 to 1226 of FIG. 12B comprise a procedure that iteratively processes each message schema element parsed from the unified input file. Each message schema element corresponds to XML Schema elements as defined in W3C Recommendation. The procedure produces a collection of all message schema elements that have class declarations indicated in the input file at block 1224. One skilled in the art understands that such collections are common in data processing and can take many forms, often as structured data or associated objects stored in computer memory.

The procedure at block 1226 also effects a flattened view of the hierarchy relating the message schema elements by establishing a bidirectional association between child elements in the hierarchy that have no annotated class declaration and the closest parent in the hierarchy that does have a class declaration. The flattened view may be advantageously utilized in subsequent compiler processing.

Blocks 1228 to 1280 comprise a procedure that iteratively processes each message schema element previously added to the collection of elements with class declarations at step 1224. During its iterations the procedure generates computer code for an MOI Controller. Each operation that generates code has its code placed in a file represented in FIG. 12 by block 1203. In the presently described embodiment the generated code consists of JAVA programming language statements. Other embodiments could, of course, generate program code in other forms and languages, for example, C++.

Figure 12C:
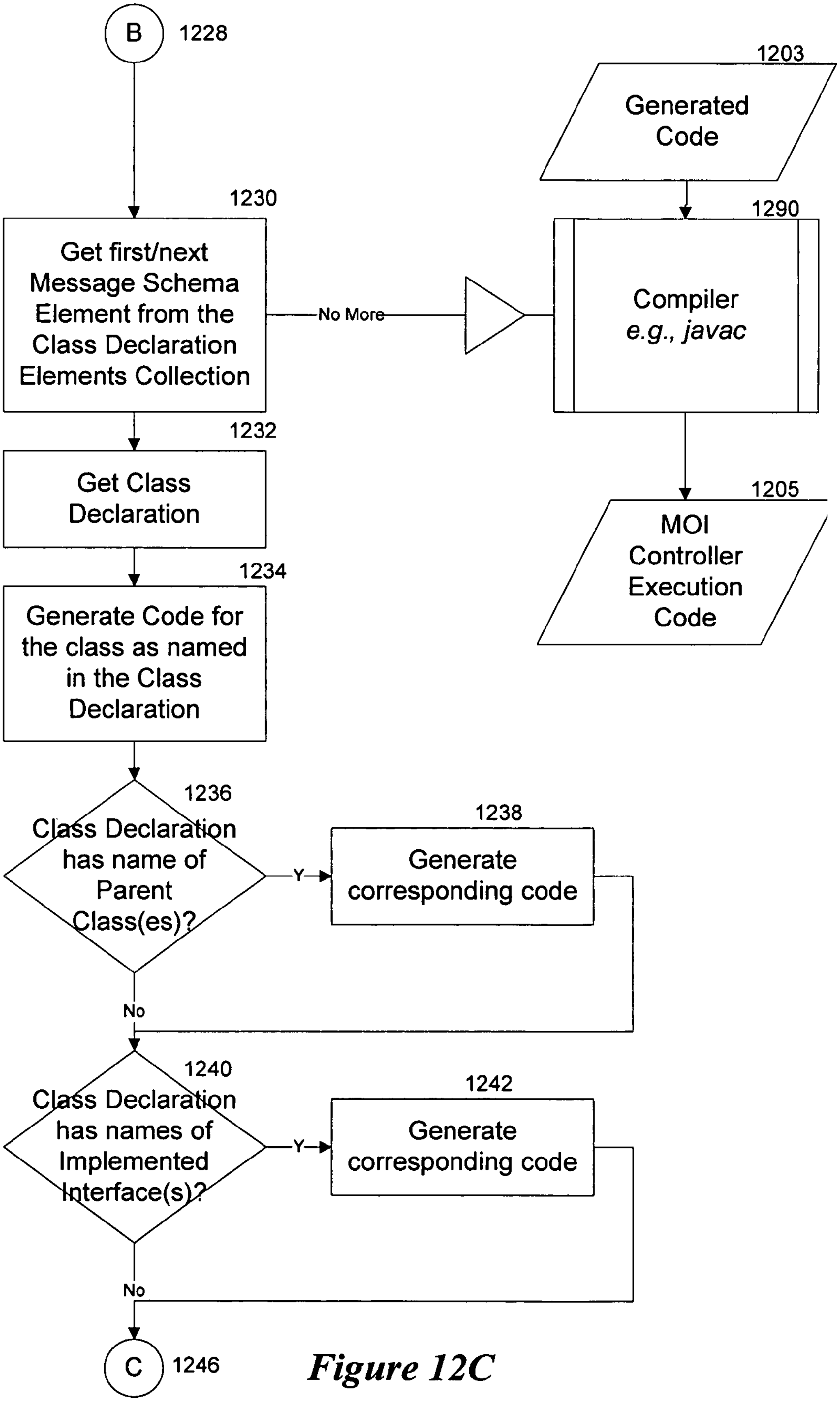

Each iteration starts at block 1230 of FIG. 12C. In the first iteration a first message schema element from the class declaration elements collection is identified for processing during the iteration as the "current element," and in each subsequent iteration a next, yet unprocessed message schema element for the class declaration elements collection is identified as the "current element" for that iteration. In Block 1232 the class declaration is retrieved from the parsed schema for the current element. Properly formatted code is generated for output file 1203 to declare a class with the name indicated in the class declaration just retrieved. If the class declaration further designates one or more parents, corresponding code is generated for the output file 1203 at block 1238. Similarly, if the class declaration designates one or more implemented interfaces, corresponding code is generated for the output file 1203 at block 1242.

Figure 12D:
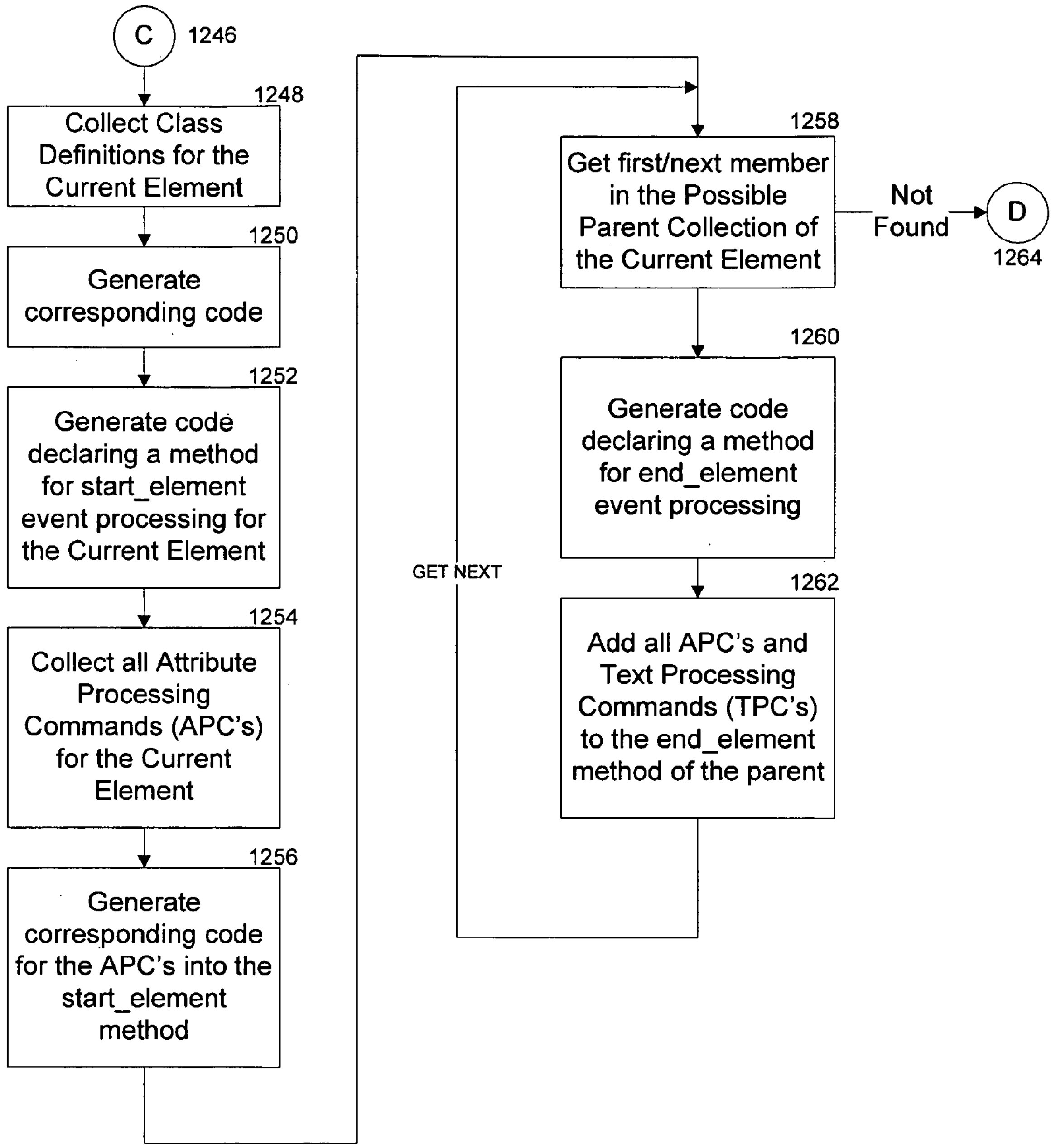

At block 1248 of FIG. 12D a collection of class definitions for the current element is created and corresponding code is generated for output file 1203 at block 1250. At block 1252 code is generated for output file 1203 to declare a method for start_element event processing for the current element. The generated method, when implemented as part of a functioning MOI adapter, will be invoked in association with detection by a parser that an inbound compound message is supplying a message element of the same type. At block 1254 a collection of attribute processing commands for the current element is created and corresponding code is generated for output file 1203 at block 1256.

Blocks 1258 to 1262 show processing that iterates over each member in the collection of possible parents created for the current element at block 1226 of FIG. 12B as earlier discussed. At block 1260 of FIG. 12D, code is generated for output file 1203 to declare end_element event processing for the current element when the end_element processing is invoked with a parameter identifying the parent of the instant iteration (or null). The generated method, when implemented as part of a functioning MOI adapter, will be invoked in association with detection by a parser that an inbound compound message is finished supplying a message element of the same type. At block 1262 code is generated for output file 1203 within the just declared method, that corresponds to the text processing commands of the current element. When processing completes for all members of the possible parent collection, processing proceeds to consideration of the current element's children.

Figure 12E:
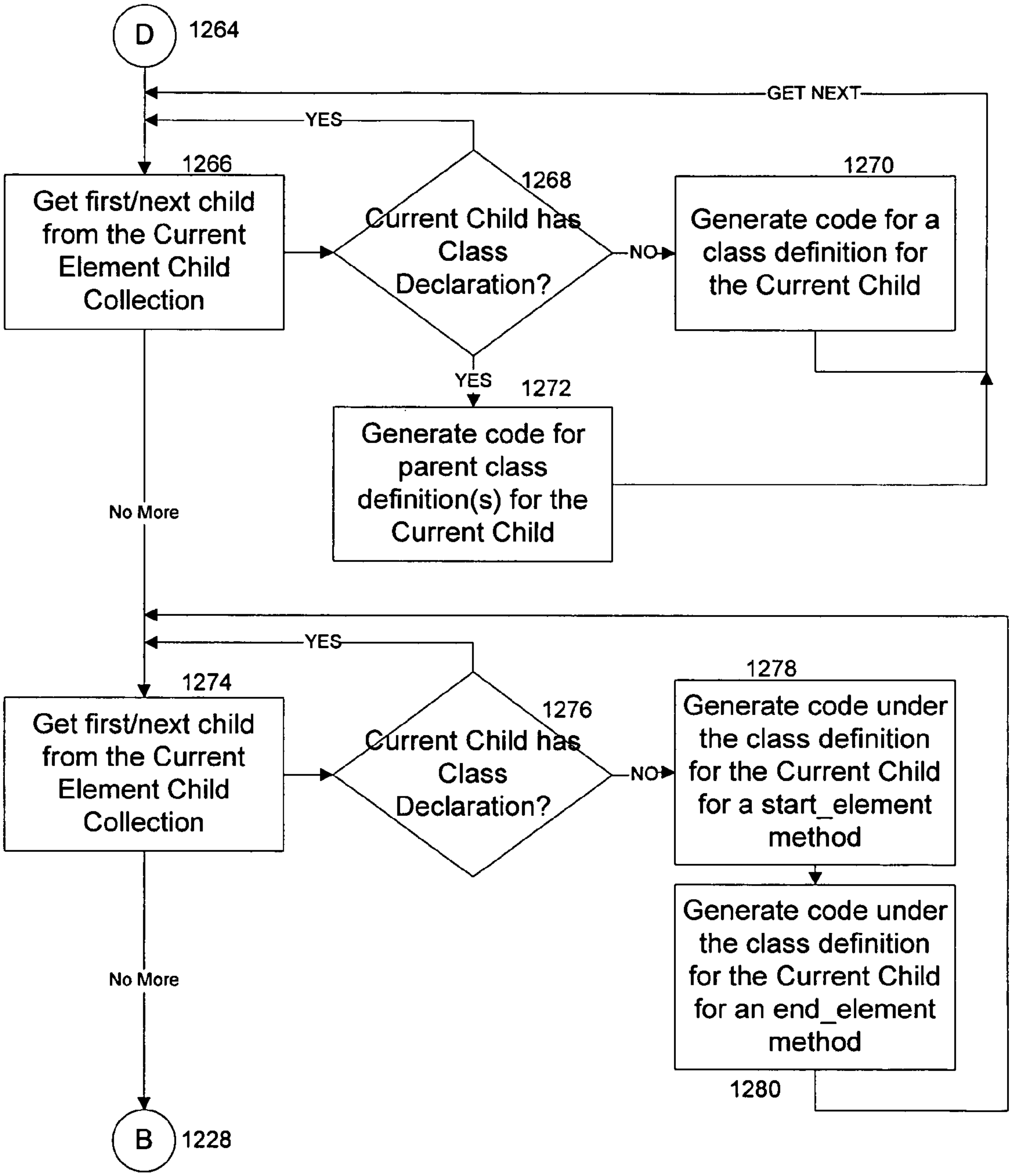

FIG. 12E depicts two procedures that iterate over the child collection of the current element. In the first procedure comprising blocks 1266 to 1272, one child from the collection is identified as the "current child" for the instant iteration at block 1266. If the representation of the current child in the parsed message includes a class declaration, code is generated for output file 1203 for parent class definitions at block 1272. If the representation of the current child in the parsed message does not include a class declaration, code is generated for output file 1203 for current child class definitions at block 1270. In the first procedure comprising blocks 1227 to 1280, one child from the collection is identified as the "current child" for the instant iteration at block 1274. If the current child does not have a class declaration, code is generated for output file 1203 for a start_element method and an end_element method under the class definition for the current child at blocks 1278 and 1280.

When the iterations through the child element collection for the current element are completed, processing returns to block 1230 of FIG. 12C where a new "current element" is established. When the collection of class declaration elements of block 1230 is exhausted, all generated code is placed in the generated code file 1203 and the generated code file is available for use to implement computing systems using MOI adaptation for all of its advantages. The MOI Controller Compiler illustrated by FIG. 12 performs the additional processing of invoking a computer language compiler to process the generated code file 1203 and produce an execution code file for an MOI Controller (1205). The embodiment illustrated by FIG. 12 illustratively generates JAVA language code and so invokes a JAVA language compiler such as javac as indicated at block 1290 of FIG. 12C. Not shown, an alternative embodiment of an MOI Controller Compiler such as illustrated by FIG. 12 could advantageously perform the additional processing of initiating further processing on an execution code file as appropriate. Such additional processing might, for example, bind the execution code file to other component parts of an MOI Adapter.

FIGS. 13A through 131, collectively referred to as FIG. 13, depict an illustrative example of a source code file generated by an MOI Controller Compiler (such as 1203 of FIG. 12). Annotations have been included in the example code of FIG. 13 to aid the reader in understanding the present invention. It is understood that an MOI Controller Compiler according to the present invention need not generate such annotations. FIG. 13 represents one example of source code that might be generated by an MOI Controller Compiler operating in accordance with the flowchart of FIG. 12 and processing the illustrative unified input file of FIG. 11.

Figure 14:
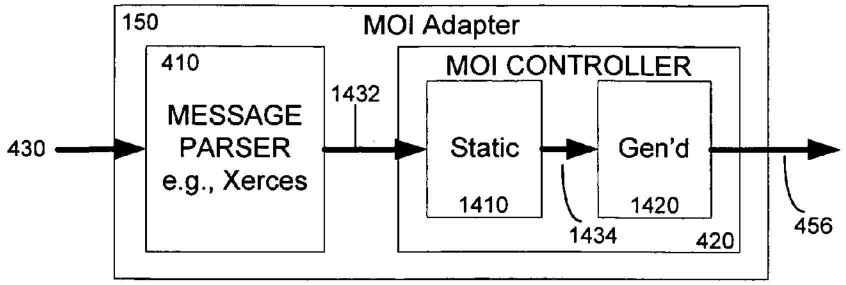
FIG. 14 is a block diagram highlighting a preferred embodiment of an MOI Adapter.

FIG. 14 is a block diagram highlighting a preferred embodiment of an MOI Adapter. The MOI Adapter 150 comprises a message parser 410 and MOI Controller 420 as discussed earlier in relation to FIG. 4. The MOI Controller 420 of FIG. 14 further comprises a static module 1410 and a generated module 1420. In this preferred embodiment, the message parser for an inbound compound message of the data processing system is a Xerces message parser as previously described. Static module 1410 interfaces with the Xerces parser preferably using the Xerces XNI interface. In this configuration, the static module 1410 provides computer program code to direct computer processing to effectuate the handling of at least four events signaled from parser 410 over interface 1432. The static module preferably performs the processing that is common to MOI Controller functions without regard to the content and structure an inbound compound message and without regard to application service module interface invocations (as represented by 456 of FIG. 14) that should ensue. Accordingly, the static module is independent or agnostic as to the use of the particular information items presented, and processes them neutrally. The generated module may be the direct or indirect product of an MOI Controller Compiler like the illustrative embodiment depicted in the flowcharts of FIG. 12, and is so in a preferred embodiment. The generated module 1420 of FIG. 14 preferably performs the processing for an MOI Controller that is specialized in regard to the content and structure an inbound compound message and in regard to application service module interface invocations (as represented by 456 of FIG. 14) that should ensue. The principal interface 1434 between the static module 1410 and the generated module 1420 is made in the preferred embodiment using the start_element and end_element methods as exposed by the generated module.

The static module 1410 of the presently described embodiment provides computer program code directing computer processing to effectuate the handling of at least begin_element, new text data, end_document, and end_element events signaled from parser 410 over interface 1432. Flowcharts for illustrative event handlers in a preferred embodiment appear in FIGS. 15 through 18. The flowcharts diagram the depicted event handling operations of an illustrative static module that manages its state using three stack constructs and a flag. Stacks and flags are well known in the art. The stacks in the preferred embodiment hold references rather than actual programming structures, constructs, or objects as is well understood in the art. A discussion of a stack item in the following description implies the object referenced by the stack item and not the reference value actually residing on the stack unless otherwise indicated. Similarly, discussion of putting an object on a stack or taking an object off the stack implies the putting or taking of a corresponding reference value. Further, unqualified discussion of a stack item implies the top stack item unless otherwise indicated.

The first state-maintaining stack of the preferred embodiment holds element schemas and is called the Schema Stack. The second holds data objects and is called the Data Object Stack. The third holds buffers for containing the text value data received in the compound message for a respective element (CDATA in XML terminology) and is called the Text Data Stack. The state-maintaining flag is used to indicate whether the MOI Adapter has been signaled with a request to return a list of all data objects processed for an inbound compound message to an executing computing process that invoked its services. With this background one of skill in the art can further appreciate the illustrative static module by reference to the flowcharts of FIGS. 15 through 18 and the discussion that follows.

Figure 15A:
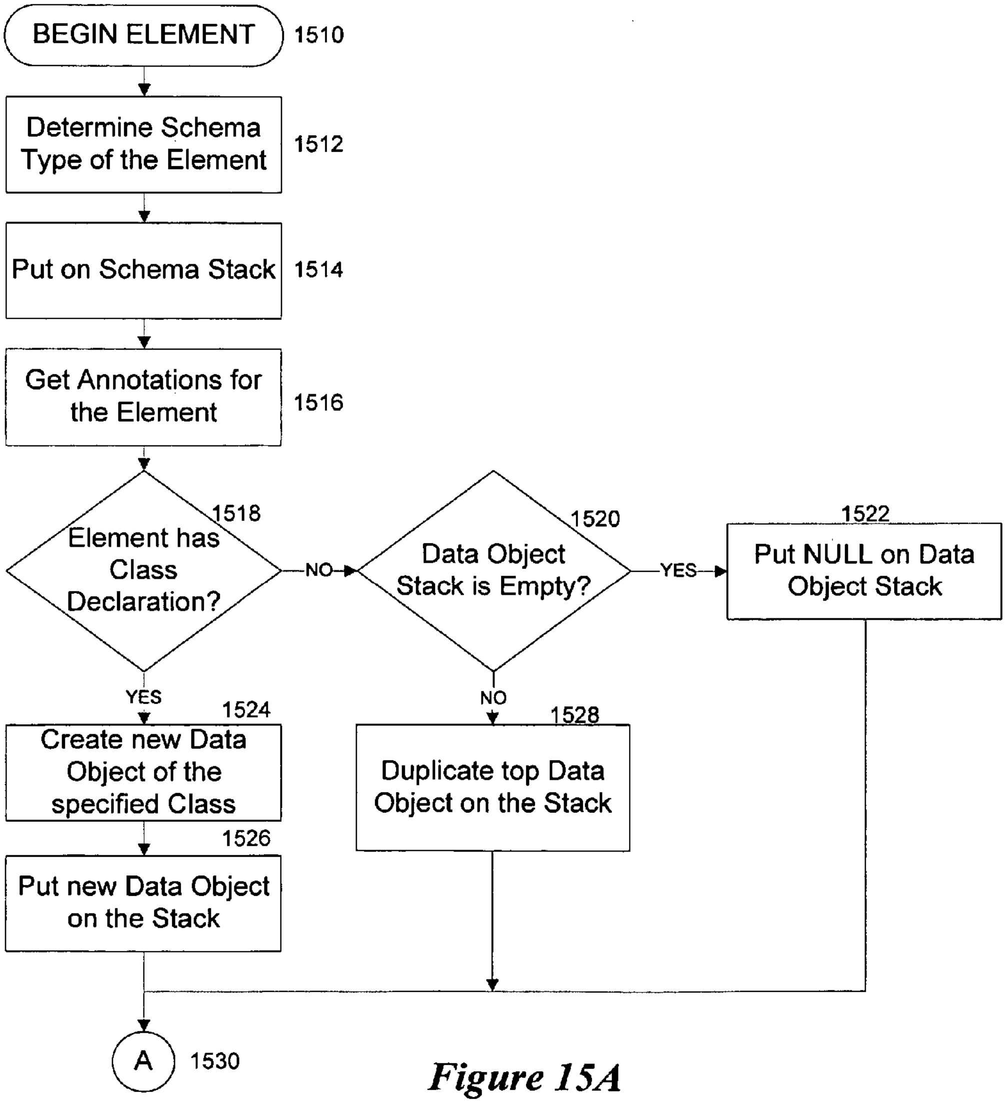
FIGS. 15A through 15B, collectively referred to as FIG. 15, is a flowchart of a begin_element handler for an MOI Controller static module.
Figure 15B:
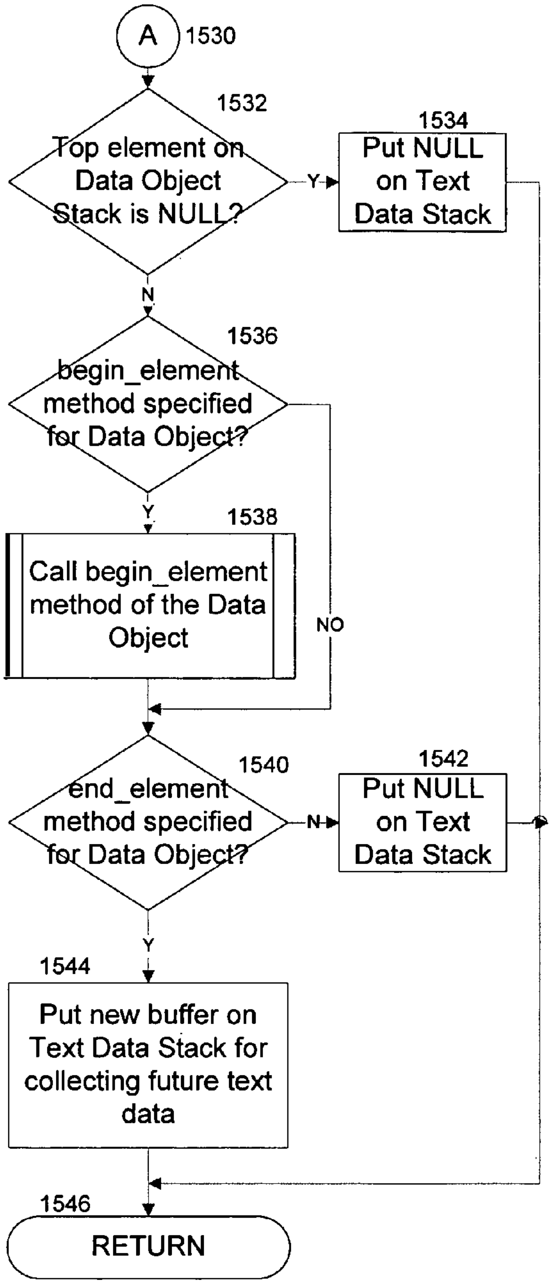

FIGS. 15A through 15B, collectively referred to as FIG. 15, is a flowchart of a begin_element event handler for an MOI Controller static module. The begin_element event handler is invoked by the message parser when it encounters and identifies a new element in the inbound compound message. In the presently described embodiment the message parser reads and processes the inbound message using a message schema (such as the unified message schema of FIG. 11) corresponding to the inbound message. At block 1512 of FIG. 15A the begin_element event handler determines the schema type for the element for which it was invoked by the parser. The determined schema type is put on the schema stack at block 1514. Annotations are then accessed from the schema for the element at 1516. If the element annotations include a class declaration, a new data object of the class specified in the annotation is instantiated 1524 and placed on the data object stack 1526. If not, a null value is placed on the data object stack if the stack is empty 1522, otherwise the top data stack item is duplicated on the stack 1528. Preceding operations facilitate a flattened view of the message hierarchy as discussed earlier in relation to MOI Controller Compiler operation and FIG. 12B which may benefit further MOI Controller processing. Subsequently, a determination made as to whether the top data object on the stack is null indicating that current element has no class declaration. If it is, a null value is placed on the text data stack at 1534 of FIG. 15B to keep data object stack and text data stack in synch and processing for the event handler completes. If not, a determination is made at 1536 whether a begin_element method is specified for the data object. If it is, the begin_element method in the generated module of the MOI Controller (420 of FIG. 14) corresponding to the data object class type is exercised by the interface 1434 indicated in FIG. 14. Regardless, a determination is made at block 1540 of FIG. 15B whether an end_element method is specified for the data object. If not, a null value is put on the text data stack at 1542. If so, a new buffer is put on the text data stack at 1544. The new buffer will be used to accumulate text data arriving for the element as the inbound compound message is processed. Begin_element event handler processing then completes at 1546.

Figure 16:
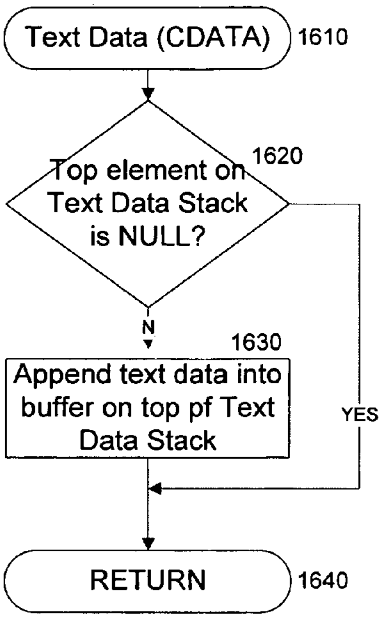
FIG. 16 is a flowchart of a text data handler for an MOI Controller static module.

FIG. 16 is a flowchart of a text data event handler for an MOI Controller static module. The text data event handler is invoked by the message parser as it receives text data for the actual element data value (in contrast to metadata, tags, etc.) in the inbound compound message. The text data is commonly referred to as CDATA in XML terminology. The text data event handler determines whether to top text data stack item is null at 1620. A null value indicates that the element is not used by the MOI Adapter to exercise application service module processing over its outbound interface (456 of FIG. 14). In this case, the text data is ignored and processing for the event handler completes at 1640 of FIG. 16. If a buffer is at the top of the text data stack, as the alternative, the event handler appends the new text data it received for this invocation to the contents of the top buffer at 1630, and processing for the event handler completes at 1640.

Figure 17:
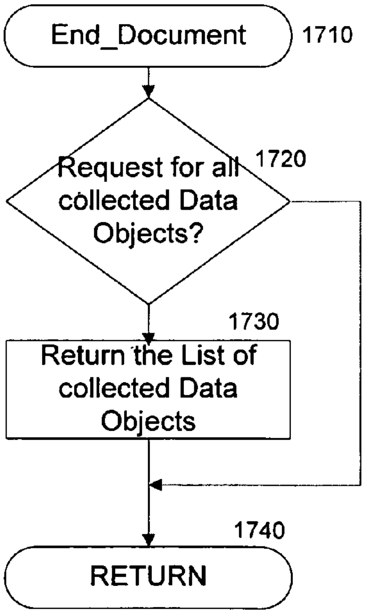
FIG. 17 is a flowchart of an end_document handler for an MOI Controller static module.

FIG. 17 is a flowchart of an end_document event handler for an MOI Controller static module. The end_document event handler is invoked by the message parser when it encounters and identifies the end of the inbound compound message. A determination is made at 1720 by checking the value of the status-maintaining flag as to whether a list of collected data objects was requested. If not, processing for the event handler completes at 1740. If so, the list is returned 1730 as processing completes for the event handler 1740.

Figure 18:
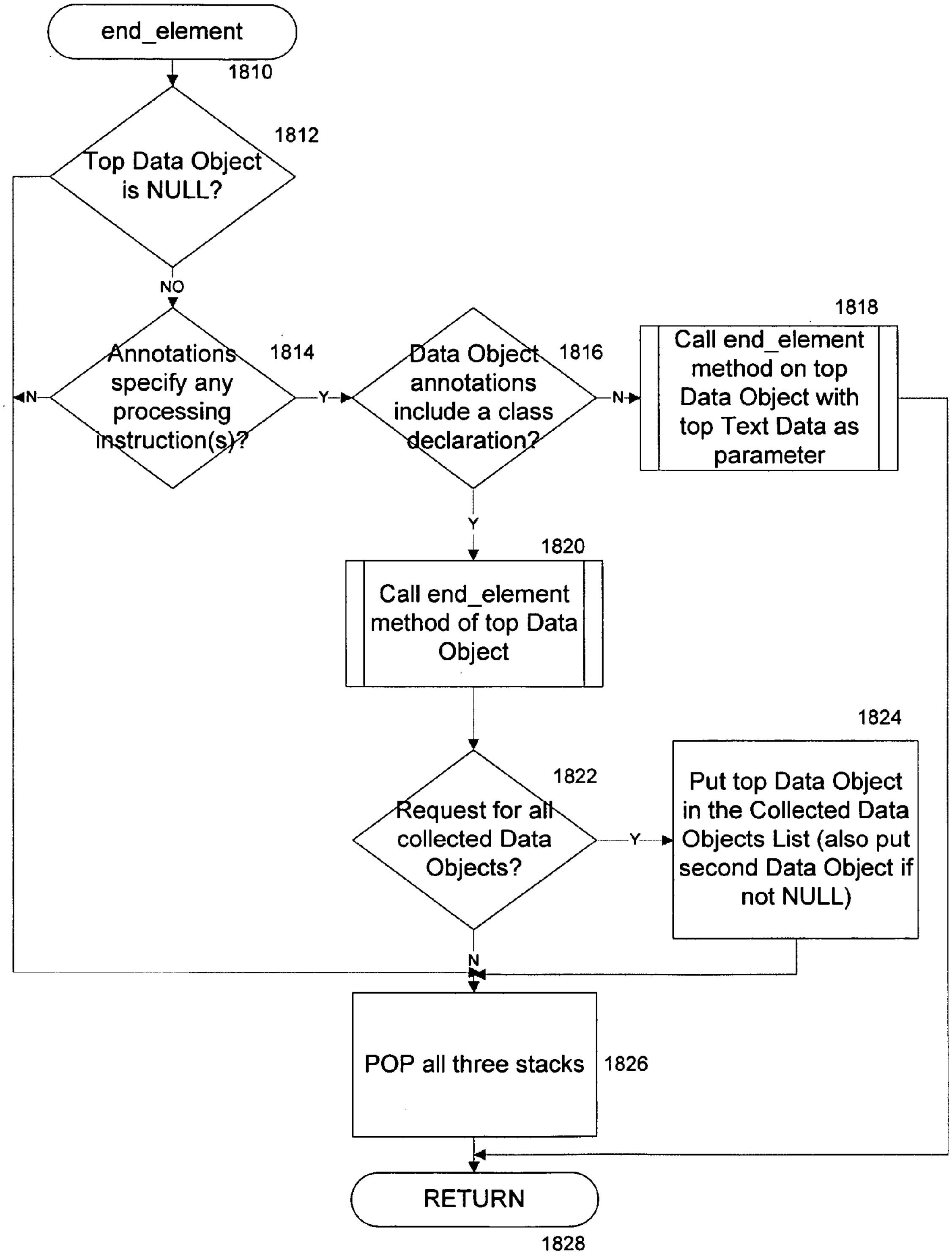
FIG. 18 is a flowchart for an end_element handler for an MOI controller static module.

FIG. 18 is a flowchart for an end_element event handler for an MOI controller static module. The end_element event handler is invoked by the message parser when it encounters and identifies the end of an element in the inbound compound message. At 1812 a determination is made whether the top data object, placed on the stack when the begin_element event handler processing described earlier in relation to FIG. 15A was applied to the message element now ending. If the top data object is null, processing proceeds to block 1826 of FIG. 18. If the top data object is not null, a determination is made at 1814 as to whether annotations in the schema for the element now ending specifies any processing instructions. If not, processing proceeds to block 1826. If so, a determination is made at 1816 as to whether annotations related to the top data object on the stack include a class declaration. If not, the end_element method of the top data object is invoked with the top text data buffer passed as a parameter. This results in an invocation of a corresponding end_element method in the generated module of the MOI Controller. Processing for the end_element event handler then completes at 1828.

If a positive determination was instead made at block 1816, the end_element method of the top data object is invoked without the top text data buffer as a parameter. This results in an invocation of a corresponding end_element method in the generated module of the MOI Controller. Subsequently, the state-maintaining flag is queried to determine whether a list of all collected data objects was requested. If so, the top data object is added to the list of collected data objects, as is the second data object on the stack if it is not null. Regardless, as processing for the message element is now completing, all three state-maintaining stacks are popped to remove the items corresponding to the now ending element at block 1826.

Processing for the end_element event handler completes at 1828.

Improved efficiency of development as well as efficiency of the resulting applications are further advantages of the present invention.

A Summary of the Advantages of Message-Oriented Invocation:

1. Compound message parsing is automatic and efficient—no involvement from application service module.

2. Single-pass compound message parsing for processing any of the incoming compound messages and invoking all required interfaces.

3. Non-imposing on the schema of a compound message. Changes in compound messages do not require changes in corresponding application service modules.

4. Non-imposing on the signature of IDL. Changes in IDL do not require changes in corresponding application service modules.

5. Facilitates development of type safe applications (IDL based compile/link time binding).

6. MOI Controller Compiler allows combining of multiple Message-to-IDL Binding Specifications into a single MOI Controller optimized for processing multiple compound message schemas and invoking multiple IDL invocations. It frees the application programmer to make independent changes in compound message schemas or an IDL, yet the MOI Controller Compiler builds the most efficient controller for the entire collection of messages and interfaces.

7. A single MOI Controller is capable of invoking multiple interfaces right at the point when all tokens necessary for a particular invocation are received from the incoming message.

8. A compound message document not loaded into memory, resulting in low memory consumption.

One skilled in the art will gain an appreciation for the invention by reference to the figures and written description that have preceded. The foregoing have included numerous specifics, details, and examples in order to convey an understanding of the invention, but such specifics, details, and examples do not limit the invention. For example, the generated source code file of FIG. 13 contains JAVA programming language but the practice of the invention is not so limited. One skilled in the art understands how to substitute other computer languages, such as C or C++, to achieve the desired result. As another example, the invention is discussed at length in regards to the processing of XML compound message files but, again, the invention is not so limited. Other standard or proprietary compound message formats can be advantageously processed using aspects of the present invention. As yet another example, the embodiments previously described have been explained in terms of an implementation using a central processing unit in combination with stored instructions to provide processing logic. One skilled in the art will understand that processing logic can be implemented in other ways such as in configured programmable logic devices, e.g., FPGA's, or in dedicated electronic circuitry such as that of an ASIC preferably produced using compile-to-hardware technology. In such alternative embodiments, for example, a data processing service module or MOI Adapter component is implemented as a block of circuitry. Details throughout the specification were not intended to limit the invention which is set forth in the claims that follow:

What is claimed as new and desired to be protected by Letters Patent of the United States is:

1. A data processing system having at least one processor for use in processing compound message documents, comprising:

processing logic for parsing compound message data and thereby identifying one or more information items included in a compound message;

processing logic for determining that an identified information item corresponds to a message information item in a set of one or more message information items associated with a data processing service module interface;

processing logic for collecting from the compound message data each identified information item having said determined correspondence;

processing logic for initiating the exercise of the data processing service module interface upon or after the collection of all information items corresponding to all the message information items of said set; and processing logic for discontinuing the parsing of compound message data upon or after determining that an identified information item corresponds to the last uncollected message information item in the set.

2. The data processing system of claim 1 further comprising:

processing logic for indicating the reusability of memory associated with compound message data unrelated to the one or more information items having said determined correspondence.

3. The data processing system of claim 2 wherein the indicating of reusability occurs between any subsequent occurrences of said identifying of information items.

4. The data processing system of claim 2 wherein the indicating of reusability occurs upon or after determining that an identified information item corresponds to the last uncollected message information item in the set.

5. A data processing system having at least one processor for use in processing compound message documents, comprising:

processing logic for parsing compound message data and thereby identifying one or more information items included in a compound message;

processing logic for determining that an identified information item corresponds to a message information item in one or more sets of one or more message information items, each said set associated with a respective data processing service module interface;

processing logic for collecting from the compound message each identified information item having a said determined correspondence;

processing logic for initiating the exercise of the data processing service module interface respective of a first of said one or more sets, upon or after the collection of all information items corresponding to all the message information items of said first set; and processing logic for discontinuing the parsing of a compound message upon or after determining that an identified information item corresponds to the last uncollected message information item in one of said one or more sets.

6. The data processing system of claim 5 further comprising:

processing logic for indicating the reusability of memory associated with compound message data unrelated to the one or more information items having said determined correspondence.

7. The data processing system of claim 6 wherein the indicating of reusability occurs between any subsequent occurrences of said identifying of information items.

8. The data processing system of claim 6 wherein the indicating of reusability occurs upon or after determining that an identified information item corresponds to the last uncollected message information item in one of said one or more sets.

9. The data processing system of claim 5 wherein the one of said one or more sets of said discontinuing means is the last set having an uncollected message information item.

10. The data processing system of claim 9 further comprising:

processing logic for indicating the reusability of memory associated with compound message data unrelated to the one or more information items having said determined correspondence.

11. The data processing system of claim 10 wherein the indicating of reusability occurs between any subsequent occurrences of said identifying of information items.

12. The data processing system of claim 10 wherein the indicating of reusability occurs upon or after determining that an identified information item corresponds to the last uncollected message information item among said one or more sets.

13. A method for processing compound message documents in a data processing system having at least one processor, comprising:

parsing compound message data and thereby identifying one or more information items included in a compound message;

determining that an identified information item corresponds to a message information item in a set of one or more message information items associated with a data processing service module interface;

collecting from the compound message data each identified information item having said determined correspondence;

initiating the exercise of the data processing service module interface upon or after the collection of all information items corresponding to all the message information items of said set; and discontinuing the parsing of compound message data upon or after determining that an identified information item corresponds to the last uncollected message information item in the set.

14. The method of claim 13 further comprising:

indicating the reusability of memory associated with compound message data unrelated to the one or more information items having said determined correspondence.

15. The method of claim 14 wherein the indicating of reusability occurs between any subsequent occurrences of said identifying of information items.

16. The method of claim 14 wherein the indicating of reusability occurs upon or after determining that an identified information item corresponds to the last uncollected message information item in the set.

17. A method for use in processing compound message documents in a data processing system having at least one processor, comprising:

parsing compound message data and thereby identifying one or more information items included in a compound message;

determining that an identified information item corresponds to a message information item in one or more sets of one or more message information items, each said set associated with a respective data processing service module interface;

collecting from the compound message each identified information item having a said determined correspondence; and initiating the exercise of the data processing service module interface respective of a first of said one or more sets, upon or after the collection of all information items corresponding to all the message information items of said first set; and discontinuing the parsing of a compound message upon or after determining that an identified information item corresponds to the last uncollected message information item in one of said one or more sets.

18. The method of claim 17 further comprising:

indicating the reusability of memory associated with compound message data unrelated to the one or more information items having said determined correspondence.

19. The method of claim 18 wherein the indicating of reusability occurs between any subsequent occurrences of said identifying of information items.

20. The method of claim 18 wherein the indicating of reusability occurs upon or after determining that an identified information item corresponds to the last uncollected message information item in one of said one or more sets.

21. The method of claim 17 wherein the one of said one or more sets of said discontinuing is the last set having an uncollected message information item.

22. The method of claim 21 further comprising:

indicating the reusability of memory associated with compound message data unrelated to the one or more information items having said determined correspondence.

23. The method of claim 22 wherein the indicating of reusability occurs between any subsequent occurrences of said identifying of information items.

24. The method of claim 22 wherein the indicating of reusability occurs upon or after determining that an identified information item corresponds to the last uncollected message information item among said one or more sets.

25. A data processing system having at least one processor for use in processing compound message documents, comprising:

a message parser having a first interface for accessing compound message data, and having a second interface for supplying compound message elements parsed from said compound message data, wherein at least one said compound message element is an information item; and an MOI controller coupled to the second interface of said message parser for progressively accessing compound message elements, and having a service module interface for coupling to an application service module, wherein said MOI controller collects a predetermined set of one or more information items from said parser and supplies said set via said service module interface such that the one or more individual information items of said set are directly accessible, and wherein the MOI controller causes termination of further processing by the message parser of compound message data associated with the current message.

26. A data processing system having at least one processor for use in processing compound message documents, comprising:

a message parser having a first interface for accessing compound message data, and having a second interface for supplying compound message elements parsed from said compound message data, wherein at least one said compound message element is an information item;

an MOI controller coupled to the second interface of said message parser for progressively accessing compound message elements and having:

a service module interface for coupling to an application service module, a static module for coupling to the second interface of said message parser, and for performing data processing operations of the MOI controller that are independent of information items supplied via said coupling to the message parser; and a generated module having the service module interface;

wherein said MOI controller collects a predetermined set of one or more information items from said parser and supplies said set via said service module interface such that the one or more individual information items of said set are directly accessible; and wherein the MOI controller causes termination of further processing by the message parser of compound message data associated with the current message.

27. A method in an electronic data processing system having at least one processor for processing compound message documents; comprising:

(a) receiving data of a compound message;

(b) parsing the identity of a next information item;

(c) determining whether the identified information item is associated with a service module invocation and, if not, returning to (b);

(d) collecting an information item determined to be associated with a first service module invocation; and (e) determining whether the collected information item is the last needed for said first service module invocation and, if not, returning to (b), and, if so, invoking said first service module.

* * * * *